US009825985B2

(12) United States Patent
Beutel et al.

(10) Patent No.: US 9,825,985 B2
(45) Date of Patent: Nov. 21, 2017

(54) DETECTION OF LOCKSTEP BEHAVIOR

(71) Applicant: Facebook, Inc., Menlo Park, CA (US)

(72) Inventors: Alexander Beutel, West Nyack, NY (US); Wanhong Xu, Menlo Park, CA (US)

(73) Assignee: Facebook, Inc., Menlo Park, CA (US)

(*) Notice: Subject to any disclaimer, the term of this patent is extended or adjusted under 35 U.S.C. 154(b) by 277 days.

(21) Appl. No.: 14/727,627

(22) Filed: Jun. 1, 2015

(65) Prior Publication Data

US 2015/0264079 A1    Sep. 17, 2015

Related U.S. Application Data

(63) Continuation of application No. 13/787,591, filed on Mar. 6, 2013, now Pat. No. 9,077,744.

(51) Int. Cl.
*H04L 29/06*    (2006.01)
*G06F 21/55*    (2013.01)

(52) U.S. Cl.
CPC .......... *H04L 63/1441* (2013.01); *G06F 21/55* (2013.01); *H04L 63/1416* (2013.01); *H04L 65/403* (2013.01)

(58) Field of Classification Search
CPC .............. H04L 63/1441; H04L 65/403; H04L 63/1416; H04L 21/55
See application file for complete search history.

(56) References Cited

U.S. PATENT DOCUMENTS

| | | |
|---|---|---|
| 7,310,660 B1 | 12/2007 | White et al. |
| 2004/0151121 A1* | 8/2004 | Natarajan ........... H04L 41/0893 370/252 |
| 2005/0015455 A1* | 1/2005 | Liu ...................... G06Q 10/107 709/207 |
| 2007/0118909 A1 | 5/2007 | Hertzog et al. |
| 2007/0124801 A1 | 5/2007 | Thomas et al. |
| 2008/0091509 A1 | 4/2008 | Campbell et al. |
| 2008/0104180 A1 | 5/2008 | Gabe et al. |

(Continued)

OTHER PUBLICATIONS

Anagnostopoulos, A., et al., "Approximation algorithms for co-clustering," In Proceedings of the twenty-seventh ACM SIGMOD-SIGACT-SIGART symposium on Principles of database systems, PODS '08, pp. 201-210, New York, NY, USA, 2008.

(Continued)

Primary Examiner — Darren B Schwartz
(74) Attorney, Agent, or Firm — Perkins Coie LLP

(57) ABSTRACT

Disclosed here are methods, systems, paradigms and structures for determining fraudulent content in a social network. The methods include identifying a plurality of users of the social network who perform a plurality of tasks within the social network in a lockstep manner. In the method, the plurality of users are determined to be performing a given task in the lockstep manner when the plurality of users each perform the given task within a predefined duration of time, where the predefined duration of time is associated with the given task. The method further includes identifying content data generated by the performance of the plurality of tasks by each of the plurality of users. The method further includes determining at least a portion of the content data generated by the performance of the plurality of tasks as fraudulent content.

20 Claims, 11 Drawing Sheets

(56) References Cited

U.S. PATENT DOCUMENTS

| | | | |
|---|---|---|---|
| 2009/0210444 | A1 | 8/2009 | Bailey et al. |
| 2009/0254989 | A1 | 10/2009 | Achan et al. |
| 2009/0299824 | A1 | 12/2009 | Barnes et al. |
| 2010/0095378 | A1 | 4/2010 | Oliver et al. |
| 2010/0312877 | A1 | 12/2010 | Xie et al. |
| 2011/0023116 | A1 | 1/2011 | Chen et al. |
| 2012/0246720 | A1* | 9/2012 | Xie .................. H04L 51/12 726/22 |
| 2013/0238422 | A1* | 9/2013 | Saldanha ........... G06Q 30/02 705/14.45 |
| 2014/0317736 | A1* | 10/2014 | Cao .................. H04L 63/1483 726/23 |
| 2016/0026920 | A1* | 1/2016 | Sullivan ................ G06N 5/04 706/11 |

OTHER PUBLICATIONS

Arjun Mukherjee, Bing Liu, and Natalie Glance. "Spotting Fake Reviewer Groups in Consumer Reviews", In Proceedings of the 21st international conference on World Wide Web (WWW 2012). ACM, New York, NY, USA, 191-200.

Banerjee, A., et al., "A generalized maximum entropy approach to bregman co-clustering and matrix approximation," The Journal of Machine Learning Research, 8:1919-1986, Oct. 2007.

Beutel, A., et al., "CopyCatch: Stopping Group Attacks by Spotting Lockstep Behavior in Social Networks," WWW '13 Rio de Janeiro, Brazil, 2013.

Cheng, Yizong, "Mean shift, mode seeking, and clustering," Pattern Analysis and Machine Intelligence, IEEE Transactions on, 17(8):790-799, Aug. 1995.

Crammer, K., et al., "A needle in a haystack: local one-class optimization," In Proceedings of the twenty-first ACM international conference on Machine learning, ICML '04, pp. 26-, New York, NY, USA, 2004.

Dean, J., et al., "MapReduce: Simplified data processing on large clusters," OSDI'04, Dec. 2004.

Dhillon I.S., et al., "Information-theoretic co-clustering," In Conference of the ACM Special Interest Group on Knowledge Discovery and Data Mining, New York, NY, 2003.

George, T., et al., "A scalable collaborative filtering framework based on co-clustering," In Proceedings of the Fifth IEEE International Conference on Data Mining, ICDM '05, pp. 625-628, Washington, DC, USA, 2005.

Gupta, G., et al., "Robust one-class clustering using hybrid global and local search," In Proceedings of the 22nd international conference on Machine learning, ICML '05, pp. 273-280, New York, NY, USA, 2005.

Kriegel, H.-P., et al., "Clustering high-dimensional data: A survey on subspace clustering, pattern-based clustering, and correlation clustering," ACM Trans. Knowl. Discov. Data, 3(1):1:1-1:58, Helen Martin 2009.

Maruhashi, K., et al., "MultiAspectForensics: Pattern mining on large-scale heterogeneous networks with tensor analysis," In Proceedings of the Third International Conference on Advances in Social Network Analysis and Mining, 2011.

Ott, M., et al. "Finding Deceptive Opinion Spam by any Stretch of the Imagination." Proceedings of the 49th Annual Meeting of the Association for Computational Linguistics, Jun. 19-24, 2011, pp. 309-319.

Pandit, S., et al., "Netprobe: a fast and scalable system for fraud detection in online auction networks," In Proceedings of the 16th international conference on World Wide Web, pp. 201-210. ACM, 2007.

Papadimitriou, S., et al., "DisCo: Distributed co-clustering with map-reduce: A case study towards petabyte-scale end-to-end mining," In Data Mining, 2008. ICDM '08. Eighth IEEE International Conference on, pp. 512-521, Dec. 2008.

Papalexakis, E., et al., "Co-clustering as multilinear decomposition with sparse latent factors," In Acoustics, Speech and Signal Processing (ICASSP), 2011 IEEE International Conference on, pp. 2064-2067. IEEE, 2011.

Papalexakis, E., et al., "Network anomaly detection using co-clustering," In 2012 International Conference on Advances in Social Network Analysis and Mining, ASONAM 2012.

Prakash, B.A., et al., "Eigenspokes: Surprising patterns and scalable community chipping in large graphs," PAKDD 2010, Jun. 21-24, 2010.

Non-Final Office Action dated Sep. 30, 2014, for U.S. Appl. No. 13/787,591 of Beutel, A.., et al. filed Mar. 6, 2013.

Final Office Action dated Jan. 23, 2015 for U.S. Appl. No. 13/787,591 of Beutel, A., et al., filed Mar. 6, 2013.

Notice of Allowance dated Apr. 7, 2015 for U.S. Appl. No. 13/787,591 of Beutel, A., et al., filed Mar. 6, 2013.

* cited by examiner

DETECTION OF LOCKSTEP BEHAVIOR

CLAIM OF PRIORITY

This application is a Continuation of U.S. patent application Ser. No. 13/787,591 entitled "DETECTION OF LOCKSTEP BEHAVIOR," filed Mar. 6, 2013, the entire content of which is expressly incorporated herein by reference.

FIELD

This invention generally relates to detecting fraudulent behavior in online media. More specifically, the invention relates to detecting fraudulent content generated by spammers from legitimate content generated by users in online media.

BACKGROUND

In recent years, web services have increasingly relied on social data in providing information to their users, where social data generally refers to content created by users (e.g., a user review of a product), which they knowingly and voluntarily share with other users. For example, on Facebook users discover content based on what their friends and other users like, and on Amazon users evaluate potential purchases based on other users' reviews. Unfortunately, attackers attempt to skew content perception by offering misleading feedback (through a variety of means), with the goal of increased distribution for their content. The challenge becomes distinguishing such fraudulent feedback from legitimate user feedback. Such a challenge is faced by all services that depend on user behavior for their processes and recommendations, for e.g., from stories on Facebook to product reviews on Amazon to reviews of businesses on TripAdvisor.

For example, on Facebook, Pages are used by organizations to interact with their fans. Users can "Like" a Page to let their friends know about their interests and to receive content from that Page in their News Feed, one of the primary distribution channels on Facebook. Further, other users may interpret a high "Like" count as a Page being popular and will also see their friends' Page Likes in their News Feeds. Because of the News Feed's utility as a distribution channel, attackers frequently attempt to boost Page Like counts to get increased distribution for their content. For instance, attackers have attempted to inflate Like counts through a variety of deceitful methods, including malware, credential stealing, social engineering, and fake accounts. Such ill-gotten Likes that came from someone not truly interested in connecting with a Page could affect the trust of users on such social data.

Among teaching a variety of other things, certain aspects of the inventions herein have embodiments which may satisfy one or more of the above-described issues.

SUMMARY

Introduced here are methods, systems, paradigms and structures for determining fraudulent content in a social network. In one embodiment, a computer-implemented method includes identifying a plurality of users of the social network who perform a plurality of tasks within the social network in a lockstep manner. In the method, the plurality of users are determined to be performing a given task in the lockstep manner when the plurality of users each perform the given task within a predefined duration of time, where the predefined duration of time is associated with the given task. The method further includes identifying content data generated by the performance of the plurality of tasks by each of the plurality of users. The method further includes determining at least a portion of the content data generated by the performance of the plurality of tasks as fraudulent content.

Some embodiments of the invention have other aspects, elements, features, and steps in addition to or in place of what is described above. These potential additions and replacements are described throughout the rest of the specification.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION

References in this description to "an embodiment", "one embodiment", or the like, mean that the particular feature, function, or characteristic being described is included in at least one embodiment of the present invention. Occurrences of such phrases in this specification do not necessarily all refer to the same embodiment, nor are they necessarily mutually exclusive.

References in this description to "a Like", "Liking", "Liked", "endorse", or the like, refers to a user making a connection with a Facebook Page, an advertisement, or other content off of Facebook.

References in this description to "social network" refer to an online service, platform, or site that facilitates the building of networks or social relations among people who, for example, share interests, activities, backgrounds, or real-life connections.

References in this description to "social data" refer to content created by users (e.g., a user review of a product, an indication of an interest in a product by endorsing, say Liking, the product), which the users knowingly and voluntarily share with other users.

As discussed above, detecting fraudulent social data, such as ill-gotten Likes (i.e. user endorsements), are important to maintain the integrity and usefulness of the various social networks, such as yelp, Facebook, etc. Disclosed here are methods, systems, paradigms and structures for detecting fraudulent content generated by spammers from legitimate content generated by users in online media. The method includes detecting fraudulent content in a social network by identifying suspicious groups of users in the social network who display lockstep behavior, such as Liking (i.e. endorsing) similar groups of Pages within a given window of time. The method further includes deeming at least a portion of the content generated by such suspicious groups of users as fraudulent content.

Figure 3A:
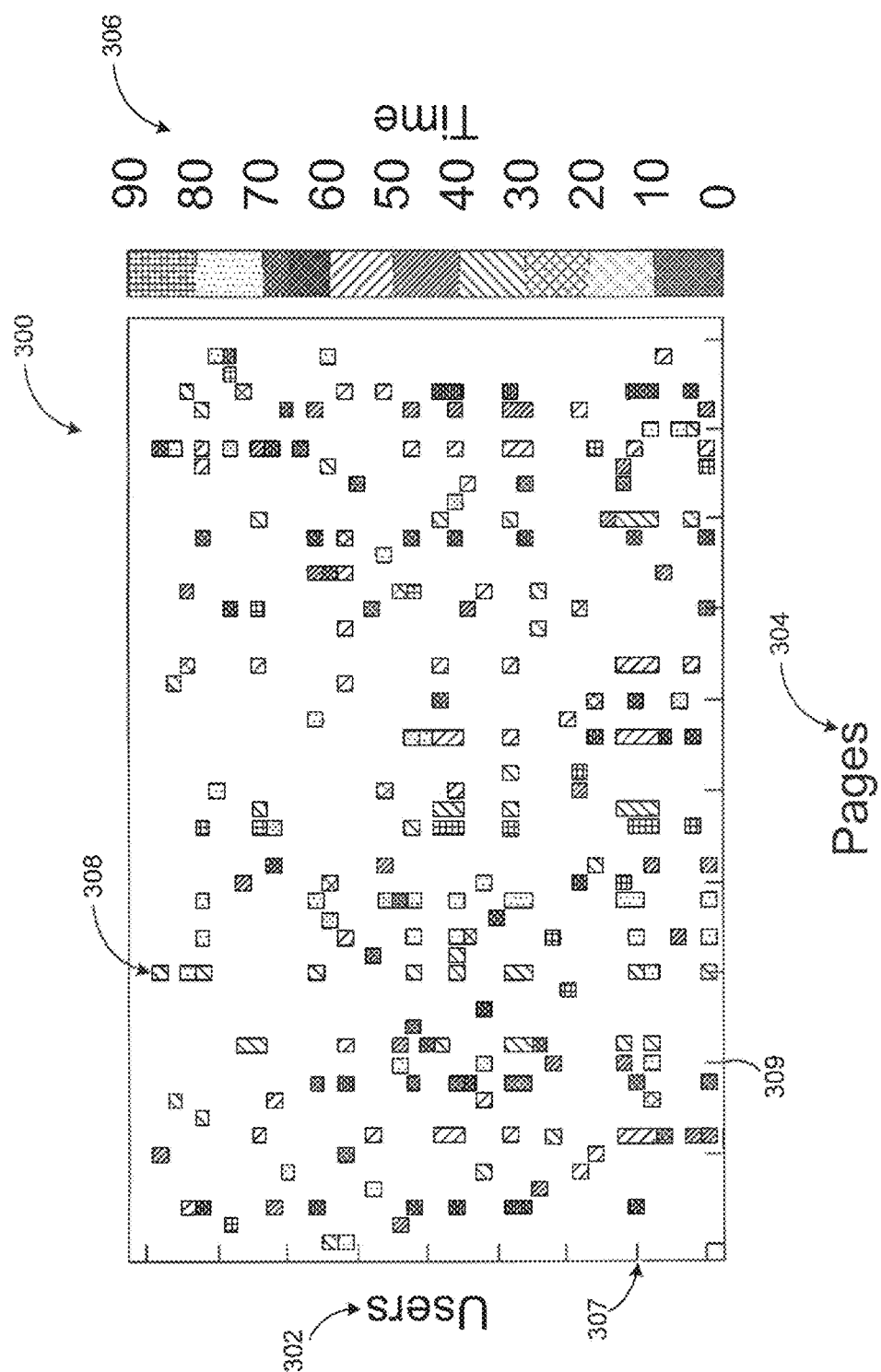
FIG. 3, which includes FIGS. 3(A), 3(B), 3(C) and 3 (D), provides an illustrative example of distribution of users and Pages before performing data clustering and after performing data clustering.
Figure 3B:
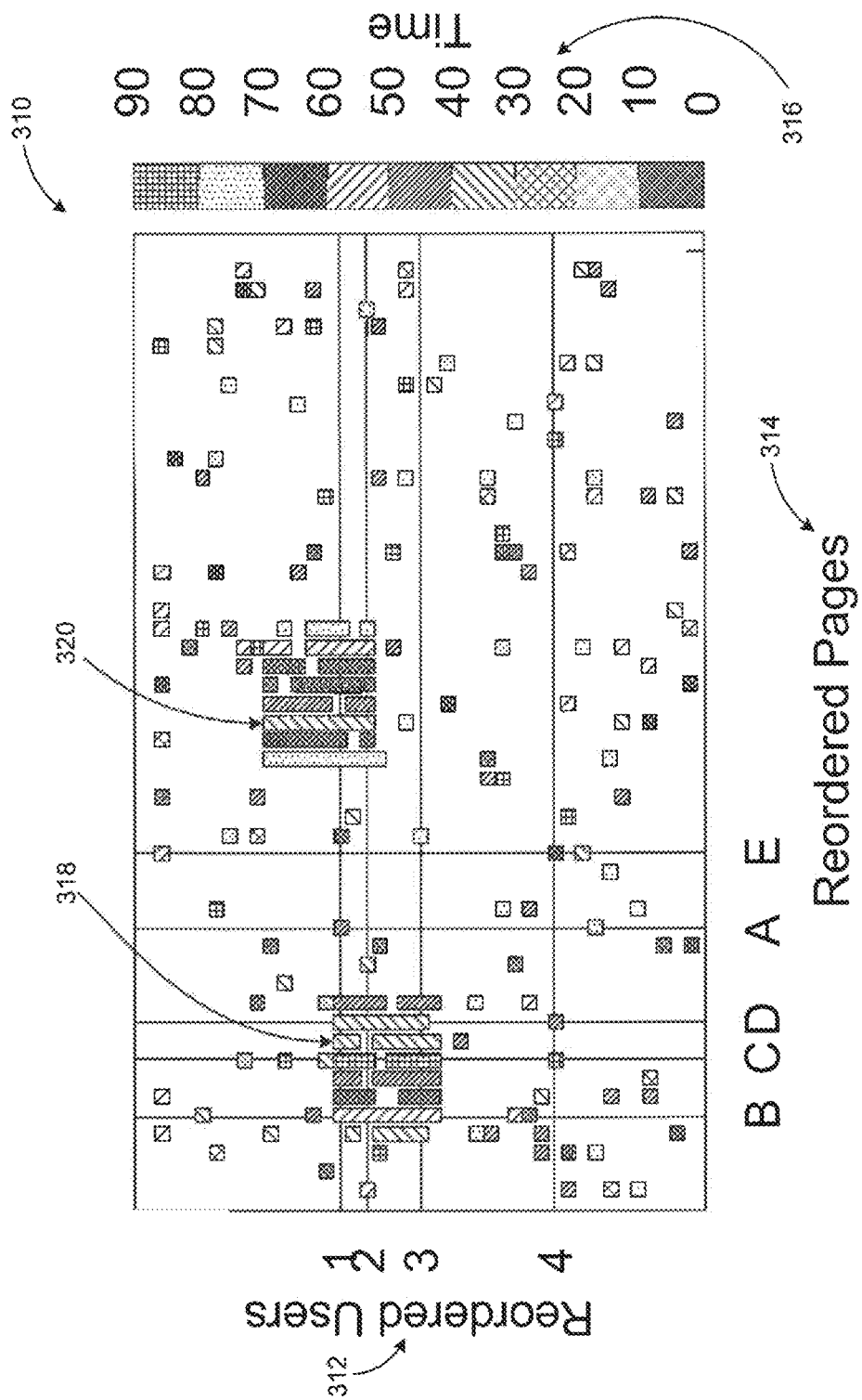
Figure 3C:
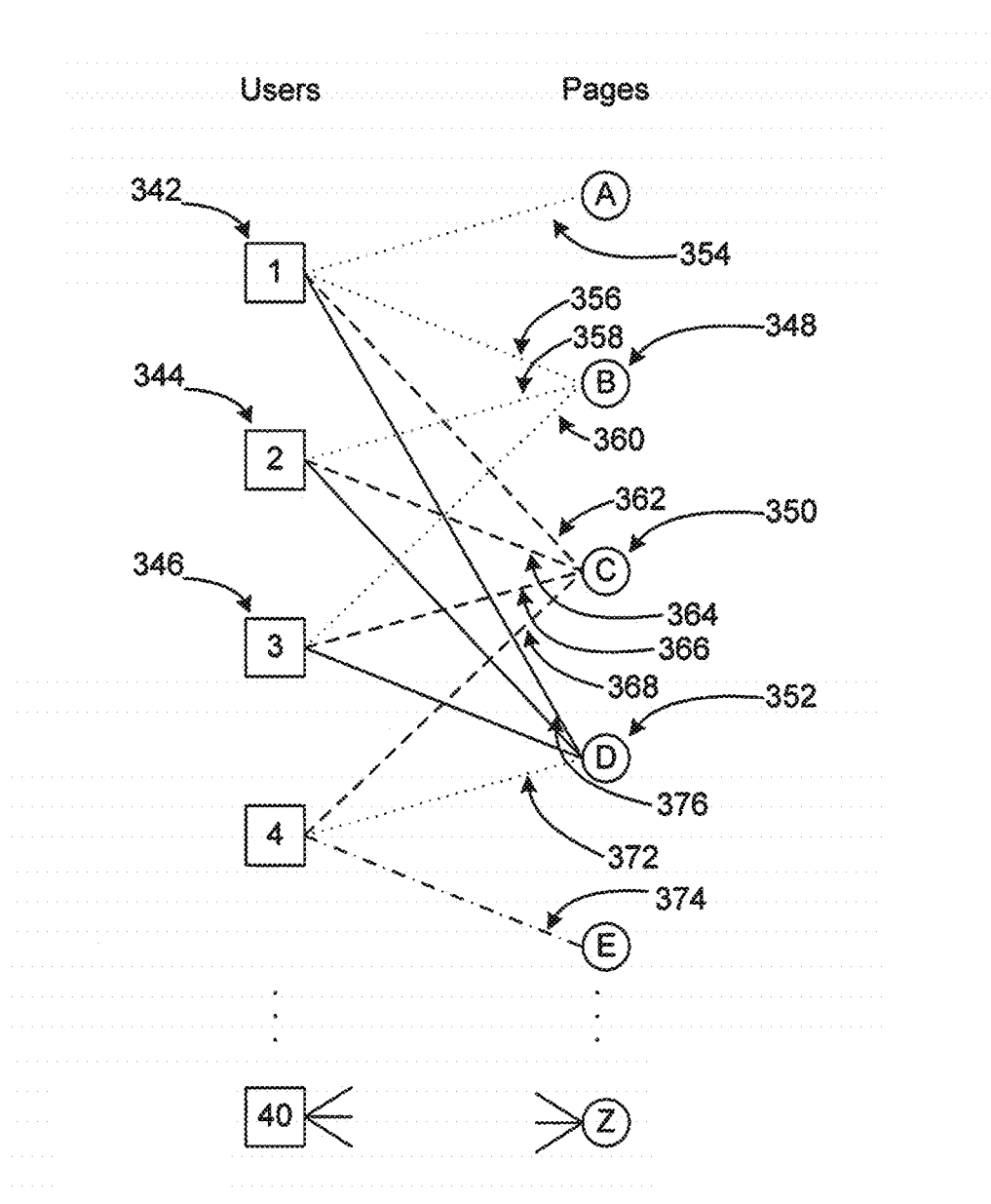

One possible method for detecting lockstep behavior in a social network includes analyzing the social graph between users and Pages and the times at which the edges between the users and the Pages in the graph were created (e.g., the time a given user Liked a given Page). FIG. 3C provides an illustrative example of a social graph between users 342-346 and Pages 348-352 with the corresponding times at which the users Liked the Pages representing the respective edges 356-368 between the users and Pages. To detect lockstep behavior, the method includes analyzing the similarity of a suspicious group of users' 342-346 connections 356-368 (i.e. edges in the social graph) to similar groups of Pages 348-352, where the similarity in connections 356-368 is determined based on various metadata, including the times at which the connection between the users 342-346 and Pages 348-352 were created. Additional details regarding the social graph is explained in later sections of the specification.

In some embodiments, the method further includes filtering the suspicious groups of users and only considering those groups of users which include a minimum number of users who performed a relevant task in association with a minimum number of Pages at around the same time as the other suspicious users. For example, the method can require that at least three users exhibit lockstep behavior by Liking at least five Pages at around the same time for the three users to be considered a suspicious group of users. Such a constraint will limit the instances where groups of innocent users, seemingly exhibiting lockstep behavior, are incorrectly identified as suspicious groups of users.

The method is effective in detecting fraudulent content as it exploits one of the critical weaknesses of spammers who generate fraudulent content. For spammers to be successful, it is important that they get as many users as possible to perform a relevant task, such as Like the spammers' Page in Facebook. However, in most social networks, each user is limited to performing the relevant task only once (with respect to a particular object), e.g., in Facebook each user can only Like each Page once, while in Amazon a user can endorse a spammer's product with a high product rating only once, etc. In addition, most of the social networks already have many anti-phishing and anti-malware mechanisms that make it difficult for real accounts to be compromised. Further, many fake accounts detection processes make it difficult to create and maintain fake accounts.

As a result, it is hard for spammers to control many accounts, and instead the spammers are forced to use the same few users to perform the relevant tasks, such as Like Pages on Facebook. So, by identifying suspicious groups of users in the social network who display lockstep behavior, where groups of users acting together, generally performing relevant tasks in association with the same Pages at around the same time as each other, the method can deem content generated by such suspicious groups of users as fraudulent content. Here, when exhibiting lockstep behavior, a suspicious group of users could have performed a relevant task in association with each Page from a subset of Pages at a different time. However, when exhibiting lockstep behavior, the suspicious group of users should have each performed a relevant task in associated with a given Page from the subset of Pages at around the same time as the other users. For example, if users #1, #2 and #3 each Like Page "A" around 6:30 pm PST on Dec. 15, 2012 and users #1, #2 and #3 each further Like Page "B" around 1:30 pm PST on Feb. 15, 2013, then users #1, #2 and #3 could be considered a suspicious group of users exhibiting lockstep behavior.

As discussed earlier, the disclosed method could be applied to a range of anomaly detection problems. In one example, the method could be used to identify ill-gotten Likes by identifying lockstep behavior of suspicious users who each Liked similar Pages around the same time. In another example, the method could be used to find bots on Twitter that systematically "Follow" people by searching for groups of users who start "following" groups of other users within a given time period. In another instance, the method could be used to analyze the relationship between reviewers and products on ecommerce sites (e.g. Amazon.com) and detect suspicious groups of users who are connected to similar groups of products.

In instances where the users provide additional data when performing the relevant action, such as providing an IP address a product review is being posted from, the product review tone, linguistic cues in the product review, etc., the additional data can be used in analyzing the similarity of connections when performing anomaly detection. The similarity analysis for some of the additional data that are provided as data strings (such as parsed strings from posted user reviews) can be performed using any well known method that provides the degree of similarity between any two provided data strings as a quantifiable value. In one embodiment, the quantified similarity value for each of the additional data can be utilized by the method to analyze the similarity of connections between the users and Pages.

The above disclosed method to detect fraudulent content by identifying lockstep behavior can be implemented using many different processes. Two such processes, which are explained in detail below, are: (1) a provably-convergent iterative process (also referred to as the "serial process"); and (2) an approximate, scalable MapReduce process (also referred to as the "parallel process"). In the following sections, the two processes are explained using how they could be utilized to identify ill-gotten Likes in a social network. However, as explained above, the two processes can be applied to a range of other anomaly detection problems by changing the definition of the relevant user action and the context in which the relevant user action is performed by the user.

Figure 1:
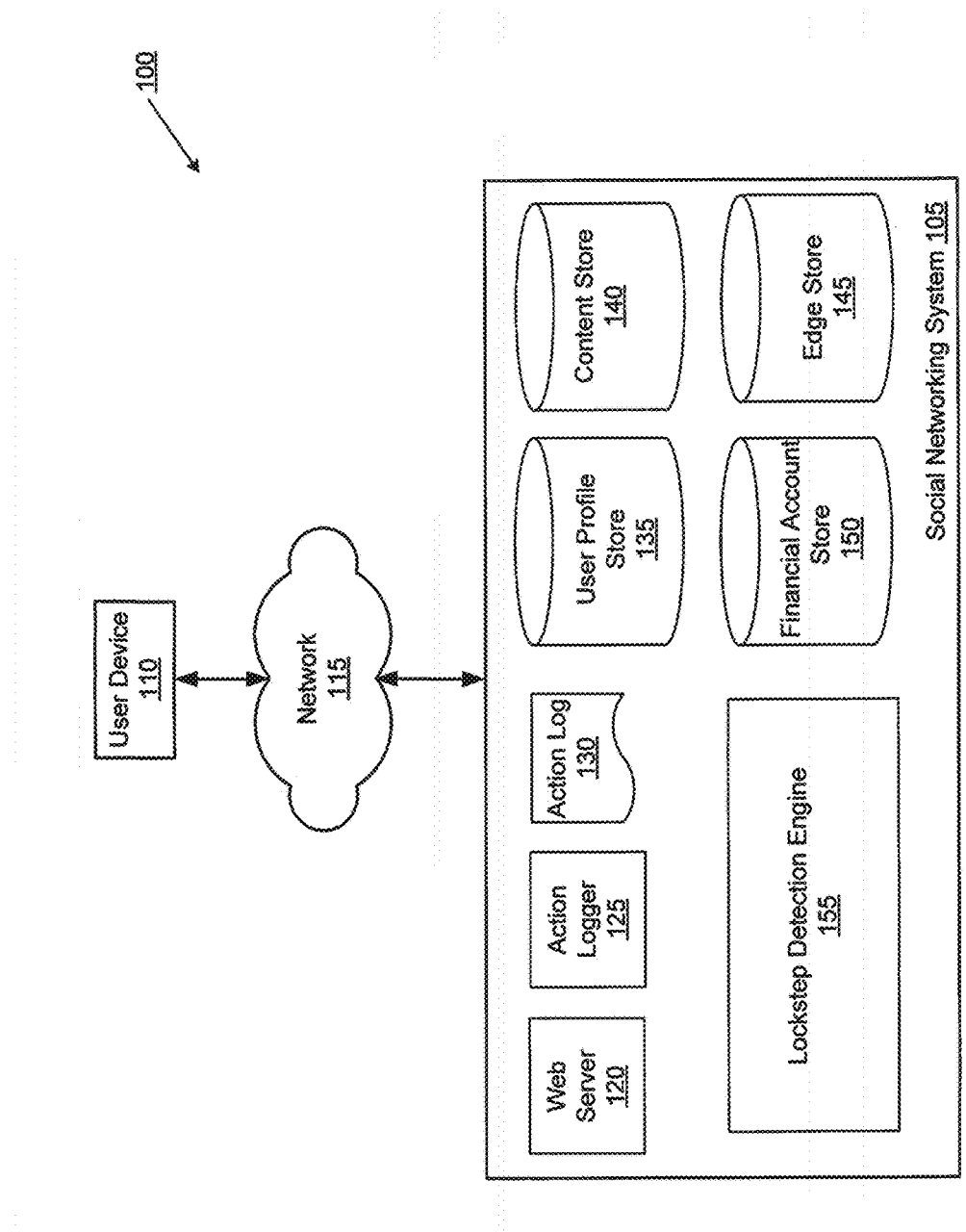
FIG. 1 is an environment in which an embodiment of the invention may operate.

FIG. 1 is an environment 100 including a social networking system 105 with which some embodiments of the present invention may be utilized, according to an embodiment of the disclosed technique. The system environment 100 includes a user device 110 interacting with a social networking system 105 over a network 115. In other embodiments, the system environment 100 may include different and/or additional components than those shown by FIG. 1.

The social networking system 105 comprises one or more computing devices storing user profiles associated with users and/or other objects as well as connections between users and other users and/or objects. In use, users join the social networking system 105 and then add connections to other users or objects of the social networking system to which they desire to be connected. As further described below, users of the social networking system 105 may be individuals or entities such as businesses, organizations, universities, manufacturers. The social networking system 105 allows its users to interact with each other as well as with other objects maintained by the social networking system 105. In some embodiments, the social networking system 105 allows users to interact with third-party websites and financial account providers.

Based on stored data about users, objects and connections between users and/or objects, the social networking system 105 generates and maintains a "social graph." comprising a plurality of nodes interconnected by a plurality of edges. Each node in the social graph represents an object or user that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system 105 modifies edges connecting the various nodes to reflect the interactions. In another example, when a user Likes a Page, an edge in the social graph is generated connecting a node representing the user and an additional node representing the Page. The generated edge represents the connection time between the user and the Page, indicating the time when the user Liked the Page.

A user device 110 is a computing device capable of receiving user input as well as transmitting and/or receiving data via the network 115. In one embodiment, the user device 110 is a conventional computer system, such as a desktop or laptop computer. In another embodiment, the user device 110 may be a device having computer functionality, such as a personal digital assistant (PDA), mobile telephone, smart-phone or similar device. The user device 110 is configured to communicate with the social networking system 105, and/or the financial account provider via the network 115. In one embodiment, the user device 110 executes an application allowing a user of the user device 110 to interact with the social networking system 105. For example, the user device 110 executes a browser application to enable interaction between the user device 110 and the social networking system 105 via the network 115. In another embodiment, a user device 110 interacts with the social networking system 105 through an application programming interface (API) that runs on the native operating system of the user device 110, such as IOS® or ANDROID™.

The user device 110 are configured to communicate via the network 115, which may comprise any combination of local area and/or wide area networks, using both wired and wireless communication systems. In one embodiment, the network 115 uses standard communications technologies and/or protocols. Thus, the network 115 may include links using technologies such as Ethernet, 102.11, worldwide interoperability for microwave access (WiMAX), 3G, 4G, CDMA, digital subscriber line (DSL), etc. Similarly, the networking protocols used on the network 115 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network 115 may be represented using technologies and/or formats including hypertext markup language (HTML) or extensible markup language (XML). In addition, all or some of links can be encrypted using conventional encryption technologies such as secure sockets layer (SSL), transport layer security (TLS), and Internet Protocol security (IPsec).

The social networking system 105 includes a web server 120, an action logger 125, an action log 130, a user profile store 135, a content store 140, an edge store 145, a financial account store 150, and a lockstep detection engine 155. In other embodiments, the social networking system 105 may include additional, fewer, or different modules for various applications. Conventional components such as network interfaces, security mechanisms, load balancers, failover servers, management and network operations consoles, and the like are not shown so as to not obscure the details of the system architecture.

Web server 120 links social networking system 105 via network 115 to one or more user devices 110; the web server 120 serves web Pages, as well as other web-related content, such as Java, Flash, XML, and so forth.

Each user of the social networking system 105 is associated with a user profile, which is stored in the user profile store 135. A user profile includes declarative information about the user that was explicitly shared by the user, and may also include profile information inferred by the social networking system 105. In one embodiment, a user profile includes multiple data fields, each data field describing one or more attributes of the corresponding user of the social networking system 105. The user profile information stored in user profile store 135 describes the users of the social networking system 105, including biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 105 displayed in an image. A user profile in the user profile store 135 may also maintain references to actions by the corresponding user performed on content items in the content store 140 and stored in the edge store 145.

A user profile may be associated with one or more financial accounts, allowing the user profile to include data retrieved from or derived from a financial account. A user may specify one or more privacy settings, which are stored in the user profile, that limit information from a financial account that the social networking system 105 is permitted to access. For example, a privacy setting limits the social networking system 105 to accessing the transaction history of the financial account and not the current account balance. As another example, a privacy setting limits the social networking system 105 to a subset of the transaction history of the financial account, allowing the social networking system 105 to access transactions within a specified time range, transactions involving less than a threshold transaction amounts, transactions associated with specified vendor identifiers, transactions associated with vendor identifiers other than specified vendor identifiers or any suitable criteria limiting information from a financial account identified by a user that is accessible by the social networking system 105. In one embodiment, information from the financial account is stored in the user profile store 135. In other embodiments, it may be stored in the financial account store 150.

The content store 140 stores content items associated with a user profile, such as images, videos or audio files. Content items from the content store 140 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users, to invite new users to the system or to increase interaction with the social network system by displaying content related to users, objects, activities, or functionalities of the social networking system 105. Examples of social networking content items include suggested connections or suggestions to perform other actions, media provided to, or maintained by, the social networking system 105 (e.g., pictures or videos), status messages or links posted by users to the social networking system, events, groups, Pages (e.g., representing an organization or commercial entity), and any other content provided by, or accessible via, the social networking system.

The content store 140 also includes one or more Pages associated with entities having user profiles in the user profile store 135. An entity is a non-individual user of the social networking system 105, such as a business, a vendor, an organization or a university. A Page includes content associated with an entity and instructions for presenting the content to a social networking system user. For example, a Page identifies content associated with the entity's user profile as well as information describing how to present the content to users viewing the brand Page. Vendors may be associated with Pages in the content store 140, allowing social networking system users to more easily interact with the vendor via the social networking system 105. A vendor identifier is associated with a vendor's Page, allowing the social networking system 105 to identify the vendor and/or to retrieve additional information about the vendor from the user profile store 135, the action log 130 or from any other suitable source using the vendor identifier. In some embodiments, the content store 140 may also store one or more targeting criteria associated with stored objects and identifying one or more characteristics of a user to which the object is eligible to be presented.

The action logger 125 receives communications about user actions on and/or off the social networking system 105, populating the action log 130 with information about user actions. Such actions may include, for example, a user "Liking" a Page, adding a connection to another user, sending a message to another user, uploading an image, reading a message from another user, viewing content associated with another user, attending an event posted by another user, among others. The information associated with some of the above described user actions could include the time stamp of when the user action was performed by the user, such as the time stamp of when the user "Liked" a Page.

In some embodiments, the action logger 125 receives, subject to one or more privacy settings, transaction information from a financial account associated with a user and identifies user actions from the transaction information. For example, the action logger 125 retrieves vendor identifiers from the financial account's transaction history and identifies an object, such as a Page, in the social networking system associated with the vendor identifier. This allows the action logger 125 to identify a user's purchases of products or services that are associated with a Page, or another object, in the content store 140. In addition, a number of actions described in connection with other objects are directed at particular users, so these actions are associated with those users as well. These actions are stored in the action log 130.

The action log 130 may be used by the social networking system 105 to track user actions on the social networking system 105, as well as external website that communicate information to the social networking system 105. Users may interact with various objects on the social networking system 105, including commenting on posts, sharing links, and checking-in to physical locations via a mobile device, accessing content items in a sequence or other interactions. Information describing these actions is stored in the action log 130. Additional examples of interactions with objects on the social networking system 105 included in the action log 130 include commenting on a photo album, communications between users, becoming a fan of a musician, adding an event to a calendar, joining a groups, becoming a fan of a brand Page, creating an event, authorizing an application, using an application and engaging in a transaction. Additionally, the action log 130 records a user's interactions with advertisements on the social networking system 105 as well as other applications operating on the social networking system 105. In some embodiments, data from the action log 130 is used to infer interests or preferences of the user, augmenting the interests included in the user profile and allowing a more complete understanding of user preferences.

The action log 130 may also store user actions taken on external websites and/or determined from a financial account associated with the user. For example, an e-commerce website that primarily sells sporting equipment at bargain prices may recognize a user of a social networking system 105 through social plug-ins that enable the e-commerce website to identify the user of the social networking system 105. Because users of the social networking system 105 are uniquely identifiable, e-commerce websites, such as this sporting equipment retailer, may use the information about these users as they visit their websites. The action log 130 records data about these users, including webpage viewing histories, advertisements that were engaged, purchases made, and other patterns from shopping and buying. Actions identified by the action logger 125 from the transaction history of a financial account associated with the user allow the action log 130 to record further information about additional types of user actions.

In one embodiment, an edge store 145 stores the information describing connections between users and other objects on the social networking system 105 in edge objects. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 105, such as expressing interest in a Page (e.g., "Liking" the Page) on the social networking system, sharing a link with other users of the social networking system, and commenting on posts made by other users of the social networking system.

The edge store 145 stores edge objects that include information about the edge, such as the time the edge was created, affinity scores for objects, interests, and other users. Affinity scores may be computed by the social networking system 105 over time to approximate a user's affinity for an object, interest, and other users in the social networking system 105 based on the actions performed by the user. Multiple interactions between a user and a specific object may be stored in one edge object in the edge store 145, in one embodiment. In some embodiments, connections between users may be stored in the user profile store 135, or the user profile store 135 may access the edge store 145 to determine connections between users.

Figure 2A:
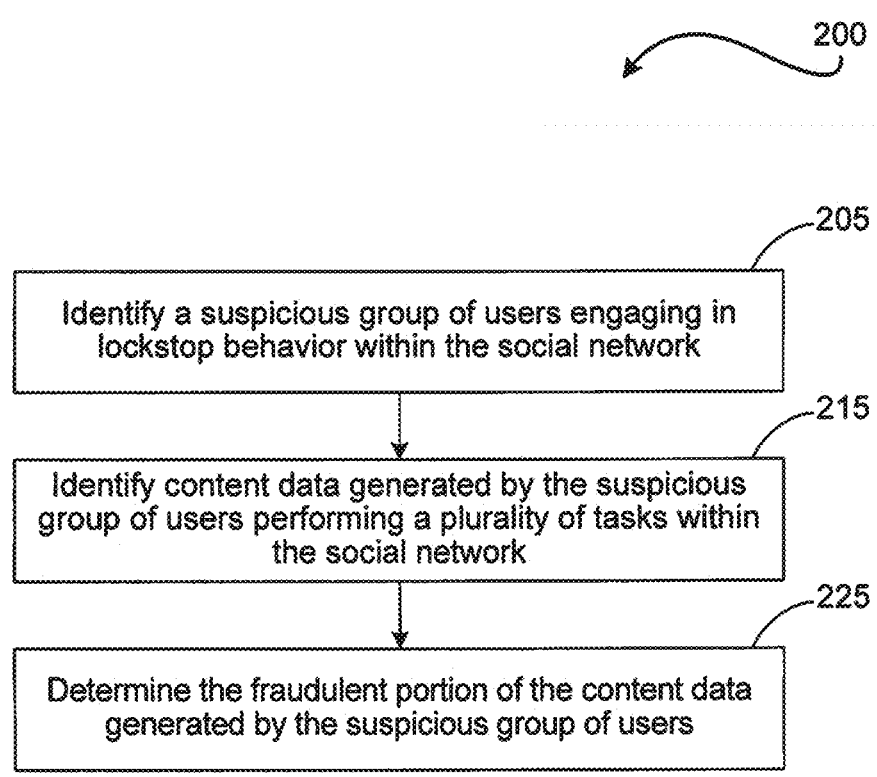
FIG. 2, which includes FIGS. 2(A) and 2(B), provide flow diagrams showing a method performed by the lockstep detection engine to detect fraudulent content in a social networking system.
Figure 2B:
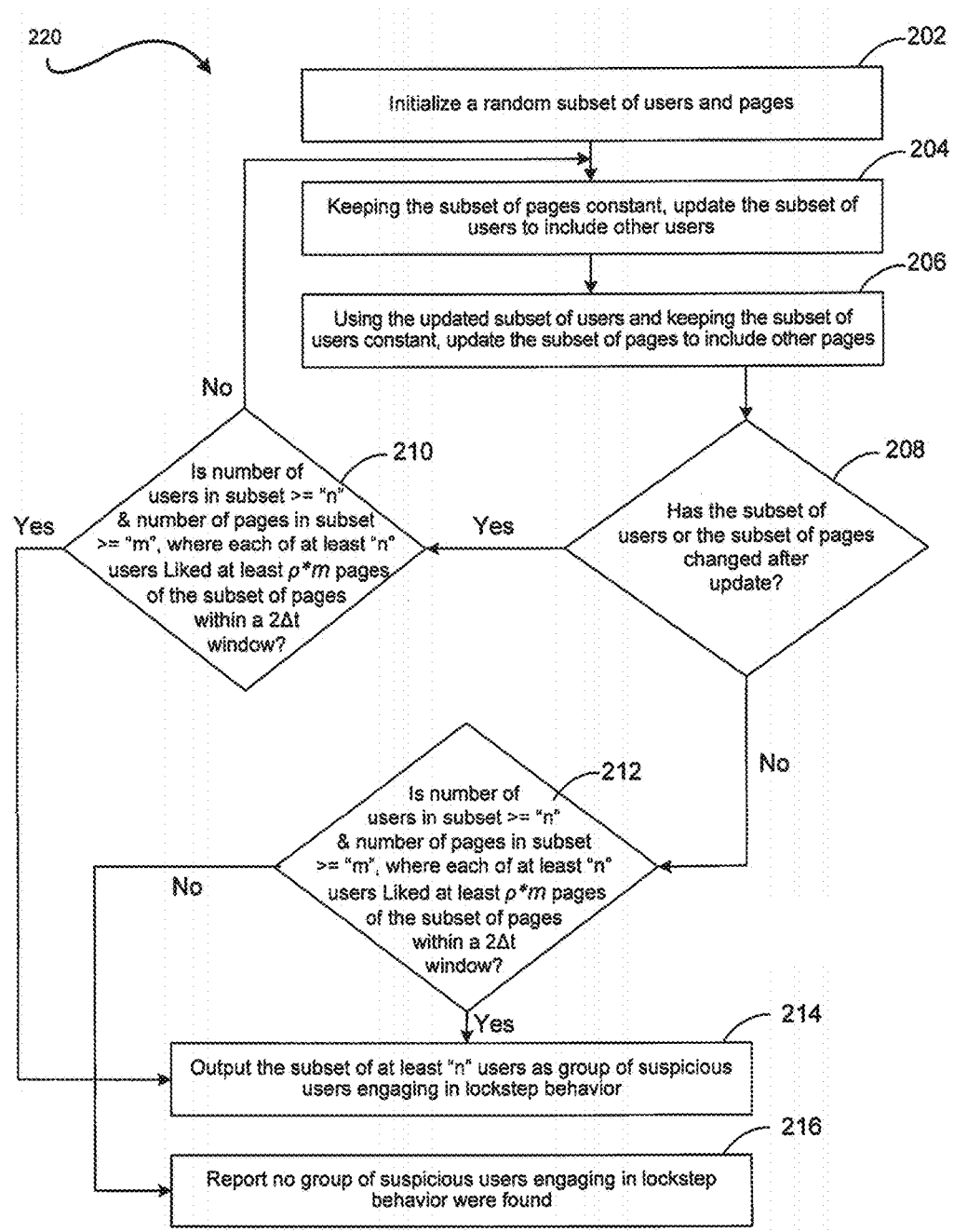

The lockstep detection engine 155 detects fraudulent content in a social network. In some embodiments, the lockstep detection engine 155 detects fraudulent content in the social networking system 105 by utilizing the method 220 disclosed in FIG. 2A. Performing method 200, in step 205, the lockstep detection engine 155 identifies suspicious groups of users in the social network who display lockstep behavior. In some embodiments, the lockstep detection engine 155 identifies suspicious groups of users in the social network by identifying those groups of users who Like similar groups of Pages within a given duration of time (also referred to as "window of time"). FIG. 2B provides a flowchart of one possible method 220 used by the lockstep detection engine 155 to identify the group of suspicious users exhibiting lockstep behavior in the social networking system 105.

In step 215, the lockstep detection engine 155 identifies all the content data generated by the suspicious group of users within the social networking system 105. In some embodiments, the lockstep detection engine 155 identifies the content data generated by the suspicious group of users by analyzing the actions performed by each of the suspicious group of users within the social networking system 105. By analyzing each user's action log 130, the lockstep detection engine 155 identifies all the data generated by each of the performed actions. For example, if a user in the suspicious group of users has Liked a particular Page, then the data regarding the user's Like of the Page is content data generated by the suspicious group of users.

In step 225, the lockstep detection engine 155 determines the fraudulent portion of the content data generated by the suspicious group of users. In some embodiments, based on step 205, the lockstep detection engine 155 identifies those actions of the suspicious group of users that were performed in lockstep with each other. In one embodiment, the lockstep detection engine 155 considers only the data generated by those actions that were performed in lockstep to be fraudulent. In some embodiments, the lockstep detection engine 155 considers all data generated by the suspicious group of users as fraudulent.

The following section provides a detailed description of the various methods used by the lockstep detection engine 155 to identify the group of suspicious users exhibiting lockstep behavior. As discussed earlier, in some embodiments, the lockstep detection engine 155 detects suspicious groups of users in the social network by performing data clustering on both the users and the Pages to sub-group the users and Pages into one or more groups where each sub-group of users have an associated sub-group of Pages that they each Liked at around the same time. Such identified groups of users who each Liked a corresponding group of Pages at around the same time are considered suspicious groups of users. In some embodiments, the lockstep detection engine 155 considers a sub-group of users suspicious when each of the sub-group of users Liked at least a certain minimum number of Pages included in an associated sub-group of Pages at around the same time as one or more other users of the sub-group of users who also Liked those same Pages. In one embodiment, the certain minimum number of Pages that a given user should have Liked can be defined as a percentage of Pages (or $\rho$, where $\rho \in [0,1]$) of the associated sub-group of Pages. In some embodiments, the lockstep detection engine 155 performs data clustering on both the users and the Pages by utilizing the method 220 disclosed in FIG. 2B.

FIG. 2B is a flow diagram showing a method 220 performed by the lockstep detection engine 155 to perform data clustering on both the users and the Pages to identify the subset of suspicious users who Liked the same subset of Pages at around the same time. As discussed earlier, when exhibiting lockstep behavior, the subset of users could have Liked each Page from a subset of Pages at a different time. However, when exhibiting lockstep behavior, the subset of users should have each Liked a given Page from the subset of Pages at around the same time as the other users. Further, in the method 220, only those groups of users which include a minimum number of users who Liked a minimum number of Pages at around the same time are considered as suspicious groups of user.

In the method 220, to identify the subset of suspicious users, data clustering on both the users and the Pages are performed to sub-group the users and Pages into one or more groups where each sub-group of users have an associated sub-group of Pages that they each Liked at around the same time. Here, the Like time is used as a constraint to cluster users into sub-groups of users with similar Like times for a sub-group of Pages. FIGS. 3A and 3B provide an illustrative example of users and Pages before performing data clustering 300 and after performing data clustering 310 respectively. In FIG. 3A, the users 302 and the Pages 304 are randomly distributed with each data point 308 representing the time 306 a given user liked a given Page, where the data points 308 exists only for those Pages that have a corresponding user who liked the Pages at some point in time. Further, each row 307 corresponds to a specific user of the social networking system 105 and each column 309 corresponds to a specific Page in the social networking system 105.

In FIG. 3B, the users were reordered 312 to group users #1, #2, #3 with similar behavior (i.e. users who behaved similarly when Liking Pages). Similarly, the Pages were reordered 314 to group Pages B, C and D which all have similar time of Like 318 from the users #1, #2, #3, where like in FIG. 3A, each data point 320 represents the time 316 a given user liked a given Page. FIG. 3C provides a graphical view of the reordered users 342-346 and reordered Pages 348-352, where each edge 356-368 between each user 342-346 and each Page 348-352 represents the time each user 342-346 Liked a corresponding Page 348-352.

In the method 220, to identify the subset of suspicious users, data clustering on both the users and the Pages are performed by iteratively clustering either the users into subsets (i.e. sub-groups) of users or the Pages into subsets of Pages while keeping the other constant until neither the subset of clustered users nor the Pages changes in response to further clustering. In each iterative step, the clustering of either the users or the Pages is improved by choosing new users (for the subset of users) or new Pages (for the subset of Pages), respectively, which increase the number of Likes the subset of users have for at least $\rho*m$ Pages from the subset of Pages within a given time frame.

As discussed above, in the method 220, data is clustered to identify sub-group of users who have an associated sub-group of Pages that were Liked by one or more users of the sub-group of users at around the same time frame. The time frame ensures that only those users whose Like time of a given Page which happens around that of Like time of other users already included in the subset of users are included, resulting in convergence of the sub-group of users to an associated sub-group of Pages that were Liked by one or more users of the sub-group of users at around the same time. In the method 220, the data clustering is stopped when no new users or new Pages could be added to the subset of users or subset of Pages, respectively, which would increase the number of Likes the subset of users have for at least $\rho*m$ Pages from the subset of Pages within the given time frame. At this point, the subsets of users who have similar Like times for the subset of Pages have converged and the subset of users represent the suspicious group of users who exhibit lockstep behavior in the social networking system 104.

Further, as discussed earlier, in the method 220, only those groups of users which include a minimum number of users who Liked a minimum number of Pages at around the same time are considered as suspicious groups of user. Here, if the converged subset of users are lesser than the minimum number of users (as described above) or if the subset of Pages Liked by the subset of users are lesser than the minimum number of Pages, the identified group of users are not considered as suspicious group of users exhibiting lockstep behavior in the social networking system 104.

Performing the method 220, the lockstep detection engine 155, in step 202, selects a random subset of users and a random subset of Pages from the available users and Pages in the social networking system 104 as a starting point to start the data clustering of both the users and Pages. In step 204, while keeping the subset of Pages constant, the lockstep detection engine 155 searches the available users to identify new users who could be included in the subset of users while removing existing users (if necessary) from the subset of users.

The lockstep detection engine 155 identifies which users to include and which users to exclude from the subset based on which combination of subset of users have a greater number of Likes for at least $\rho*m$ Pages from the subset of Pages within a given time frame, resulting in convergence of the subset of users who each Liked at least $\rho*m$ Pages from the subset of Pages at around the same time. As discussed earlier, for lockstep behavior, the time frame within which one or more users from the subset of users should have Liked the Pages included in the subset of Pages varies from Page to Page. However, the Like times of any two users (in the subset of users) for a given Page from the subset of Pages cannot be separated by more than a predefined value (e.g., 24 hours) for the Likes of the two users to be considered to be in lockstep behavior with respect to the given Page Liked by both the users.

For example, let the initial random subset of Pages include Pages "A", "B" and "C" and the initial random subset of users could include users #1, #3 and #5. Here, user #1 Liked Page "A" at 6:30 am PST on 11/10/12 and Liked Page "C" at 9:30 pm PST on 12/12/12, while user #3 Liked Page "A" at 9:30 pm PST on 11/10/12 and Liked Page "B" at 4:30 am PST on 12/11/12, and user #5 Liked Page "B" at 6:30 am PST on 12/10/12. For each Page in the subset of Pages, a time frame window can be set such that the Likes of any two users for the Page cannot vary by more than the time frame window.

For example, let Page "A" have a time frame window of 24 hours, Page "B" have a time frame window of 10 hours, and Page "C" have a time frame window of 36 hours. In this example, the Like times of user #1 and #3 of Page "A" are separated by less than 24 hours (i.e. the time frame window of Page "A") while Like times of user #3 and #5 of Page "B" is separated by more than 10 hours (i.e. the time frame window of Page "B"). So, when the number of Likes for Pages "A", "B" and "C" from users #1, #3 and #5 that fall within a given time frame are computed, there are a total of 4 (i.e. the two Likes for Page "A", one Like for Page "B" and the one Like for Page "C"). Here, only one of the Likes for Page "B" is counted as the other would fall outside the allowed time frame window to Like Page "B" (for lockstep behavior).

Further, in the above example, the lockstep detection engine 155, could consider including user #2 into the existing subset of users #1, #3 and #5, where user #2 Liked Page "A" at 5:30 am PST on 11/10/12 and Liked Page "B" at 2:00 pm PST on 12/11/12. In this example, the Like times of both user #1 and #3 of Page "A" from the Like time of user #2 of Page "A" are each separated by less than 24 hours (i.e. the time frame window of Page "A"). Similarly, the Like times of user #2 and #3 of Page "B" is separated by less than 10 hours (i.e. the time frame window of Page "B") but the Like times of user #2 and #5 of Page "B" is separated by more than 10 hours. Given that the subset of users could only include those users who have Liked at least $\rho*m$ Pages from the subset of Pages within a given time frame, the lockstep detection engine 155 would have a greater Like count by including user #2 (i.e. a total of 6 including the additional Likes for Pages "A" and "B") and excluding user #5 from the subset of users (as only either user #2 or #5 could be in the subset of users as their Like time of Page "B" are separated by more than 10 hours and user #5 has no Likes for the other Pages in the subset of Pages).

In some embodiments, the lockstep detection engine 155, in step 204, limits the search for new users to be included in the subset of users to speed up the data clustering process. In some embodiments, the lockstep detection engine 155 limits the search for new users to be included in the subset of users to only those users of the social networking system 105 who have Liked one or more Pages in the subset of Pages close to the Like time of the existing subset of users for one or more Pages in the subset of Pages. In one instance, the a Like time of a new user (not included in the existing subset of users) of a given Page is considered close to the Like time of the existing subset of users for the given Page if it falls within 2×"time frame window" of the given Page (e.g., 2×24 hrs=48 hrs for Page "A").

In step 206, while keeping the updated subset of users (i.e. subset of users determined in step 204) constant, the lockstep detection engine 155 searches the available Pages to identify new Pages which could be included in the subset of Pages. The lockstep detection engine 155 identifies which Pages to include and which Pages to exclude from the subset based on which subset of Pages received a greater number of Likes for the Pages included in the subset of Pages from the subset of users within a given time frame. This results in convergence of the subset of Pages which received Likes from the subset of users at around the same time. As discussed earlier, for lockstep behavior, the time frame within which Pages included in the subset of Pages should have a Like from one or more users from the subset of users varies from Page to Page. However, the Like times of any two users (in the subset of users) for a given Page from the subset of Pages cannot be separated by more than a predefined value (e.g., 24 hours) for the Likes of the two users to be considered to be in lockstep behavior with respect to the given Page Liked by both the users.

In some embodiments, the lockstep detection engine 155, in step 206, limits the search for new Pages to be included in the subset of Pages to speed up the data clustering process. In some embodiments, the lockstep detection engine 155 limits the search for new Pages to be included in the subset of Pages to only those Pages of the social networking system 105 that has received a Like from one or more users of the subset of users who have also all (i.e. the one or more users who Liked the new Page) Liked at least one of the Pages from the existing subset of Pages within a given time frame. In some embodiments, the lockstep detection engine 155 could replace one of the Pages from the existing subset of Pages with one of the new Pages that has not only Likes from the one or more users of the subset of users who Liked the Page being replaced from the existing subset of Pages but also received Likes from other users in the subset of users who did not have a Like for the Page being replaced (thus, implicitly, increasing the number of Likes received by the new subset of Pages from the subset of users within a given time).

For example, let the subset of Pages include Pages "A", "B" and "C" and the updated subset of users include users #1, #2 and #3. Here, user #1 Liked Page "A" at 6:30 am PST on 11/10/12 and Liked Page "C" at 9:30 pm PST on 12/12/12, user #2 Liked Page "A" at 5:30 am PST on 11/10/12 and Liked Page "B" at 2:00 pm PST on 12/11/12, and user #3 Liked Page "A" at 9:30 pm PST on 11/10/12 and Liked Page "B" at 4:30 am PST on 12/11/12. For each Page in the subset of Pages, a time frame window can be set such that the Likes of any two users for the Page cannot vary by more than the time frame window. For example, let Page "A" have a time frame window of 24 hours, Page "B" have a time frame window of 10 hours, and Page "C" have a time frame window of 36 hours.

Further, in the above example, the lockstep detection engine 155, could consider including Page "D" into the existing subset of Pages "A", "B" and "C", where Page "D" was Liked by user #1 at 5:30 am PST on 09/10/12 and by user #3 at 4:00 pm PST on 09/10/12. Page "D" has a time frame window of 36 hours. In this example, the time at which Page "D" was Liked by user #1 and #3 are separated by less than the allowed 36 hour time frame window. Also, similar to Page "C", Page "D" also received a Like from user #1 with the given time frame. Further, unlike Page "C", Page "D" also received another Like from user #3 within the given time frame. Therefore, the lockstep detection engine 155 could replace Page "C" with Page "D" in the subset of Pages and increase the number of Like counts from the subset of users for the subset of Pages within the given time frame (i.e. total like count to 7, including the additional Like for Page "D", from the current total count of 6 for the existing subset of Pages, see discussion above).

As discussed above, performing the steps 204 and 206 of the method 220, the lockstep detection engine 155 clusters the users and Pages to identify sub-group of users who have an associated sub-group of Pages that were Liked by one or more users of the sub-group of users at around the same time. The time frame ensures that only those users whose Like time of a given Page which happens around that of Like time of other users already included in the subset of users are included, resulting in convergence of the sub-group of users to an associated sub-group of Pages that were Liked by one or more users of the sub-group of users at around the same time.

In step 208, the lockstep detection engine 155 compares the subset of users determined in step 204 and subset of users determined in step 206 with the previously existing subset of users (before any update in step 204) and the previously existing subset of Pages (before any update in step 206), respectively, to determine convergence of the clustered data (i.e. subset of users and Pages). If both the subset of users and Pages remain unchanged compared to the previously existing subset of users and Pages, respectively, the lockstep detection engine 155 determines convergence of the subset of users and Pages. In other words, the lockstep detection engine 155 determines that there are no new users in the vicinity (as explained earlier) of the subset of users who could be included to improve the number of Likes within a given time frame or no new Pages that could replace an existing Page in the subset of Pages that could improve the number of Likes within a given time frame. If either the subset of users or the subset of Pages has changed, the lockstep detection engine 155 determines that the subset of users and Pages could be further clustered and proceeds to step 210 before returning to step 204 to repeat the data clustering process (if necessary).

As discussed earlier, in method 220, a subset of users which include a predefined minimum number of users who have Liked a predefined minimum number of Pages at around the same time can be considered a suspicious group of users engaging in lockstep behavior. In some embodiments, the predefined minimum number of Pages and the predefined minimum number of Pages can be experimentally determined at the point where it reduces the number of false identification of users as engaging in lockstep behavior. So, even when the subset of users and Pages haven't completely converged and identified additional users and Pages, the current subset of identified users have shown lockstep behavior with respect to the current subset of identified Pages to be deemed as a suspicious group of users.

In step 210, the lockstep detection engine 155 determines if the un-converged subset of users and Pages include at least a predefined minimum number of users (say, "n" users) who each Liked at least $\rho*m$ Pages from the subset of Pages within a predefined time window (say, $2\Delta t$, where the predefined time window can change from one Page to another). When the condition is met, the lockstep detection engine 155 proceeds to step 214 and reports the subset of users as a suspicious group of users engaging in lockstep behavior. If the condition is not met, the lockstep detection engine 155 determines that the subset of users and Pages could be further clustered and returns to step 204 to repeat the data clustering process.

In step 208, if the lockstep detection engine 155 determines convergence, the lockstep detection engine 155 proceeds to step 212 and determines if the converged subset of users and Pages include at least a predefined minimum number of users (say, "n" users) who each Liked at least $\rho*m$ Pages from the subset of Pages within a predefined time window (say, $2\Delta t$, where the predefined time window can change from one Page to another). By checking to ensure the subset of users and Pages include at least a predefined minimum number of users and a predefined minimum number of Pages, respectively, the lockstep detection engine 155 reduces the false identification of users (as discussed above). When the condition is met, the lockstep detection engine 155 proceeds to step 214 and reports the subset of users as a suspicious group of users engaging in lockstep behavior. If the condition is not met, the lockstep detection engine 155 proceeds to step 216 and reports that no suspicious group of users engaging in lockstep behavior were identified.

Figure 4:
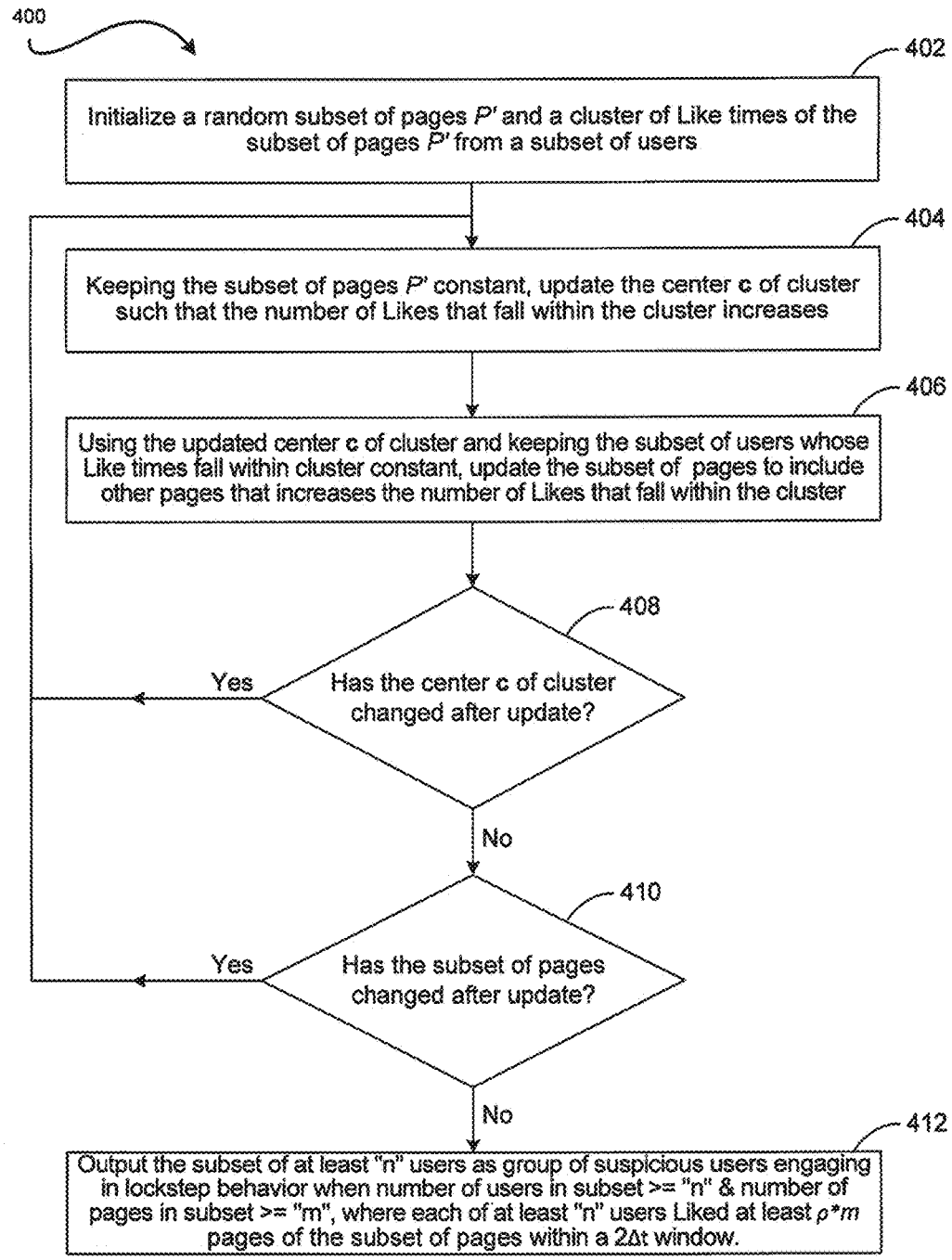
FIG. 4 provides a flowchart diagram of an illustrative serial process to implement the method described in FIG. 2.
Figure 6:
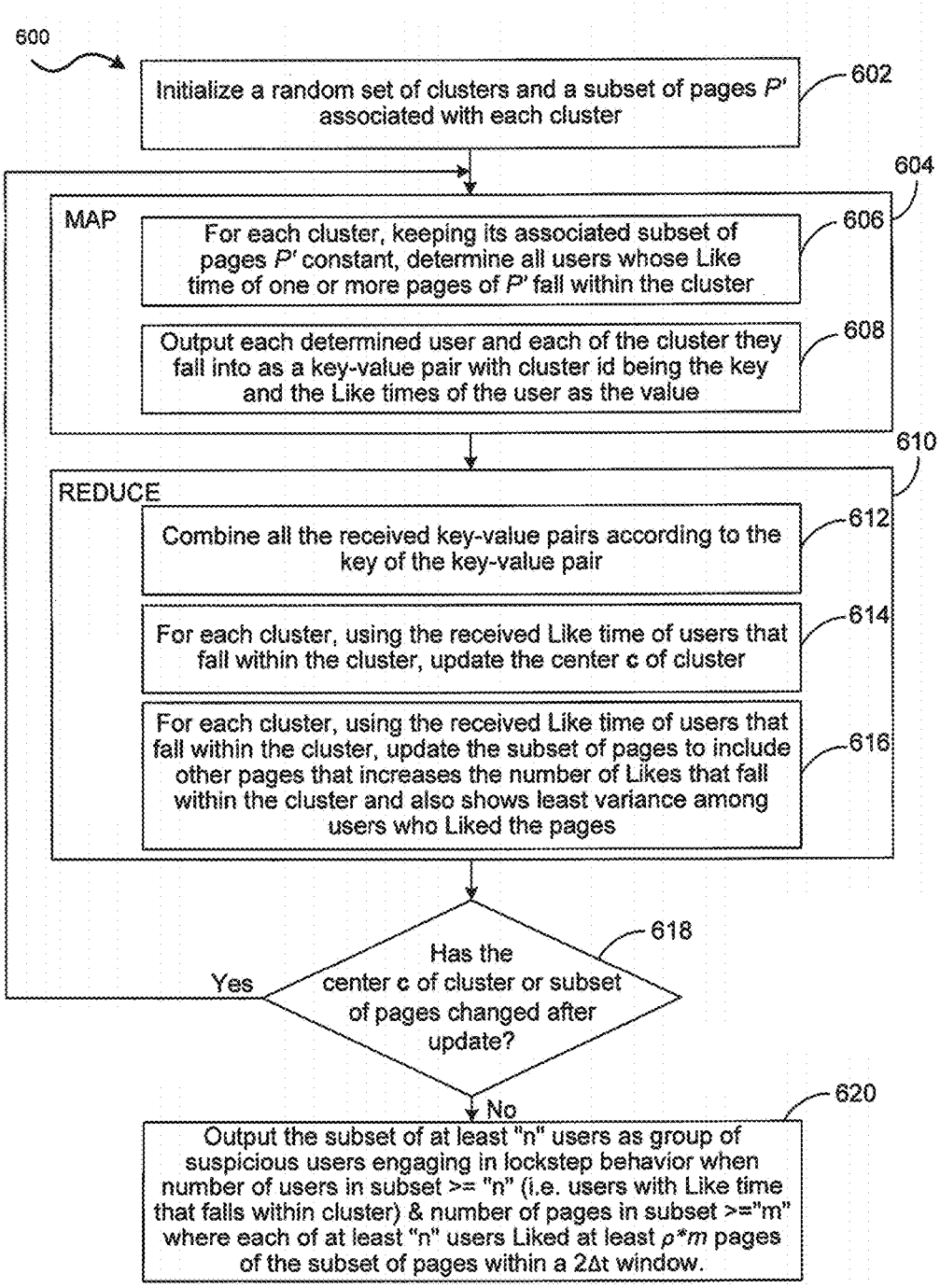
FIG. 6 provides an implementation of parallel process that takes advantage of the MapReduce framework to implement method described in FIG. 2.

By performing the method 220, the lockstep detection engine 155, thus, identifies suspicious groups of users whose social data content, in whole or in part, can be considered to be fraudulent and removed to maintain the integrity of the social data content in the social networking system 105. FIGS. 4 and 6 provide a flowchart diagram of an illustrative serial and parallel process, respectively, to implement the method 220.

FIG. 4 provides a flowchart diagram of an illustrative serial process 400 to implement the method 220. In process 400, the process of data clustering users and Pages to identify sub-group of users who have an associated sub-group of Pages which they Liked within a given time is defined as a optimization problem. FIG. 3C illustrates the users 342-346 and Pages 348-352 as a bi-partite graph (i.e. a graph with two sets of vertices or cores connected by edges), with the time at which a user Liked a Page as the edge 354-374 between the users and Pages in the bi-partite graph. By implementing the process 400, the lockstep detection engine 155 searches for near-bipartite cores, where the bipartite cores of size (n, m) such that for each of the m Pages, all n users Liked that Page in a 2Δt window (i.e. the time frame window). As discussed earlier, here the m Pages defines the predefined minimum number of Pages needed in the subset of Pages and n users define the predefined minimum number of users needed in the subset of users to deem the subset of users to be a engaging in lockstep behavior.

In process 4, to re-define the data clustering as a optimization problem, the lockstep detection engine 155 represents the users and Pages and the respective Like times of users to corresponding Pages as a M dimensional space (where M represents the number of available Pages in the social networking system 105), where each dimension of the space represents the range of Like times for a given Page. In this M dimensional space, each user is represented as a point within the M dimensional space corresponding to their Like times of the Pages of the M dimensions that they have Liked before. Here, given that users do not necessarily Like all available M Pages (and therefore have only Likes times for a subset of the M Pages), each user falls into a subspace within the M dimensional space where they have a corresponding Like time for each of the Pages that correspond to a dimension of the subspace.

Figure 3D:
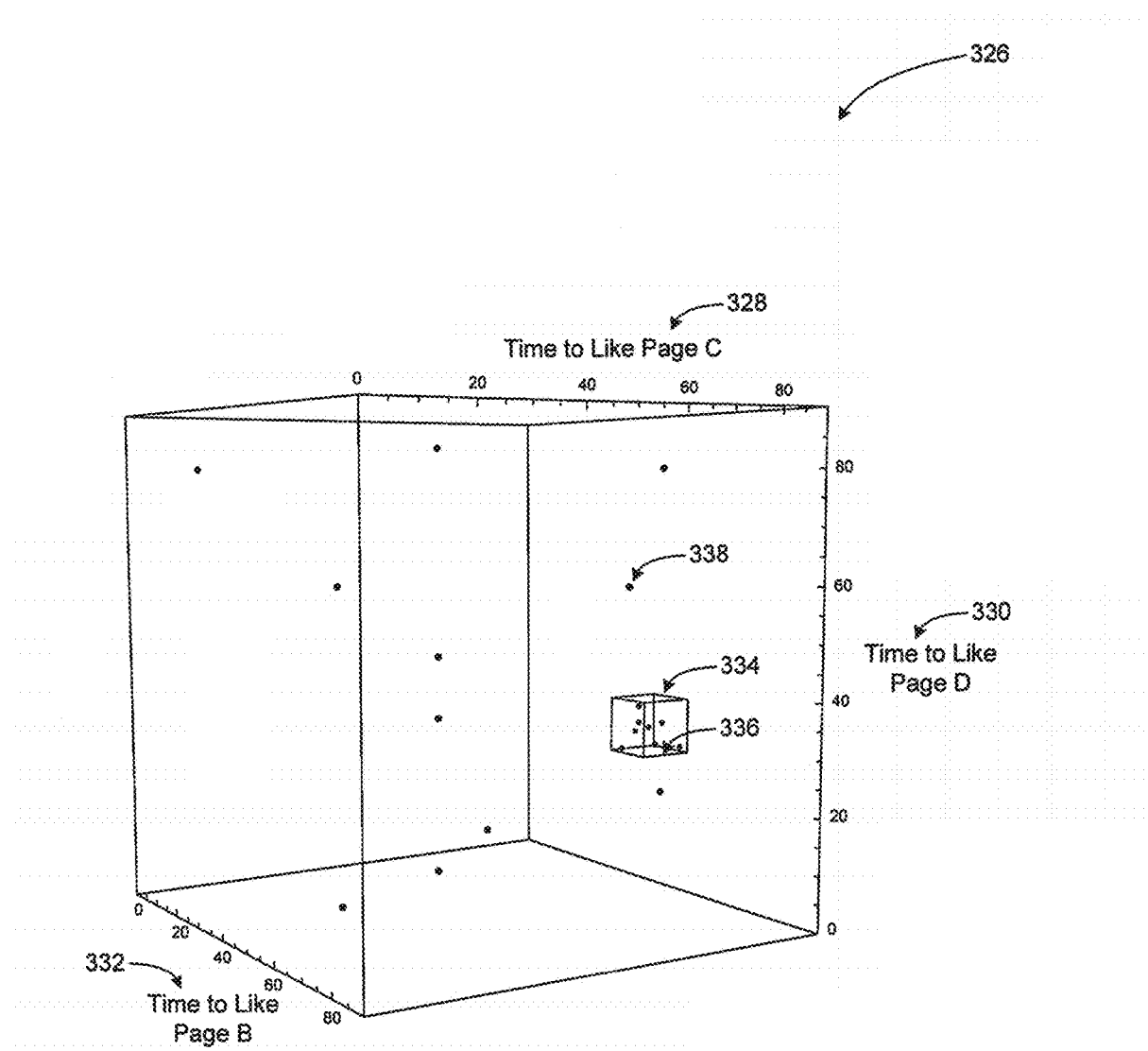

FIG. 3D provides an illustration of 3-dimensional subspace 326 within an M dimensional space, where each user 336, 338 who has Liked each of the 3 Pages 328-332 (i.e. Pages "B", "C" and "D") of the 3-dimensional subspace 326 is represented as a point within the 3-dimensional subspace 326 corresponding to their Like times of the 3 Pages 328-332 of the 3-dimensional space. In this re-defined representation of users and Pages and their corresponding Like times, the lockstep detection engine 155 considers a group of users to be lockstep behavior if there exists a hypercube 334 (within the subspace 326) of width 2Δt window (i.e. the time frame window) in at least m dimensions (i.e. 3 dimensions in this instance) such that at least n users fall within the hypercube 334.

As discussed in the method 220, performing process 400, the lockstep engine 155 identifies the hypercube 334 (also, referred to as the cluster) by iteratively alternating between updating the center c of the cluster 334 (where center c is simply a time of Like that lies in the center of all the other time of Likes included in the cluster 334) and updating the subset of Pages P' (i.e. Pages "B", "C" and "D") that are associated with the dimensions of the subspace, while holding the other (i.e. c or P) constant. Here, updating the center c of the cluster 334 results in the change in the subset of users whose Like times are included in the cluster 334 similar to the step 204 in method 220. Similarly, updating the subset of Pages P' results in replacing, if necessary, the Pages "B", "C" and "D" with a new Page "E" similar to the step 206 in method 220. Further, similar to steps 204 and 206 in method 220, in process 400, the updates of the center c of the cluster 334 and the subset of Pages P' are based on which update results in increased number of Like times of users that fall within the cluster 334.

A pseudo code of process 400 is shown below in "Process 1 Serial COPYCATCH." In process 400, updating center c of the cluster 334 is performed using function "UPDATE-CENTER" and updating subset of Pages P' is performed using function "UPDATESUBSPACE". In process 400, the center c of the cluster 334 and the subset of Pages P' are iteratively updated till neither center c of the cluster or the subset of Pages P' change (i.e. similar to method 220, there is data convergence for the subset of users in cluster 334 for the subset of Pages P).

Process 1 Serial CopyCatch function S-CopyCatch(x, j)
    Require: Preset parameters $\Delta t$, n, m, and $\rho$
    Initialize c = x, P' = {j}
    repeat
        $P'_t$ = P'
        $c_t$ = c
        c = UpdateCenter(c, P')
        P' = UpdateSubspace(c, P')
    until c = $c_t$ and P' = $P'_t$
    return [c, P]
end function The below listed Table 1 describes the various symbols used in the pseudo code:

TABLE 1

Symbols and Definitions

| Symbol | Definition and Description |
| --- | --- |
| N and M | Number of users and Pages on either side of the bipartite graph |
| L | N × M data matrix of edge (i.e. Like time) data |
| I | N × M adjacency matrix |
| U and P | Set of indices of indexed users and Pages |
| n and m | Number of users and Pages necessary to be considered anomalous for each side of the bipartite graph |
| P' | Subset of Pages that are anomalous |
| c | Vector of times for each Page around which there are anomalous users |
| 2Δt | Width of time window |
| ρ | Percent of P' for which an anomalous user must be within the time window |
| φ | Thresholding function to compare two data points |
| s | Number of clusters being search for in parallel |
| P | Set of P' for multiple clusters |
| C | Set of c for multiple clusters |

In process 400, the UPDATECENTER function works similar to step 204 in method 220. To identify the center c for the cluster 334, while holding the subset of Pages P', the UPDATECENTER function works by updating each dimension's (i.e. for each Page in the subset of Pages P) center (i.e. a time of Like that lies in the center of all the other time of Likes included in the cluster 334 for that dimension) one at a time, holding the others constant. For each update in each dimension, we take all the Like times that are within search window $\beta\Delta t$ (where the search for new users is limited to the vicinity $\beta\Delta t$ of cluster to speed up the clustering process) of the previous center and find the center that will most improve our objective of finding more Likes than before that fall within the cluster 334. Here, all Like times previously covered by the cluster 334 will be included as the width of search window for $\beta\Delta t$ is set to $\beta > 1$. Further, the UPDATE-CENTER function moves the center c of the cluster 334 only if the function find a location within the subspace 326 that covers more Likes than before (where time of Likes in the cluster 334 that have more than one user with the same time of Likes are weighted accordingly when determining the number of Likes within the cluster 334).

A pseudo code of the function UPDATECENTER, used in process 400, is shown below. The function UPDATECENTER includes sub-functions FINDUSERS and FINDCENTER. Sub-function FINDUSERS, as discussed earlier, identifies Like times of users in the vicinity of the cluster 334 which could be included to increase the count of Like times in the cluster 334 for the given subset of Pages. Using the Like times of users identified in FINDUSERS, sub-function FINDCENTER, as discussed earlier, updates the center c of cluster 334 to a location (i.e. to a new time of Like within the subspace 326) that increases the number of time of Likes that fall within the cluster 334. Therefore, with every update of the center c the subset of users who have Like times within the cluster 334 are converging for the subset of Pages P'.

| Function UpdateCenter |
|---|
| function UpdateCenter(c, P') |
|     U' = FindUsers(U, c, P') |
|     Set c' to the average of $L_{i,\cdot}$ for all $i \in U'$ |
|     for $j \in P'$ do |
|         [U', w] = FindUsers(U, c; P', j, $\beta \Delta t$) |
|         [U', $t_j$] = FindCenter(U', w, j) |
|         $c'_j = t_j$ |
|     end for |
|     return c' |
| end function |

Further, the pseudo code of the sub-functions FINDUSERS and FINDCENTER, used in function UPDATECENTER, are shown below:

| Function FindCenter |
|---|
| function FindCenter(U, w, $j_c$) |
|     Sort U by $u_{i,j_c}$ for $i \in U$ |
|     Scan sorted U linearly for subset U' such that $\Sigma_{i \in U'} w_i$ is maximized |
|     Set $c_j$ to the center of this subset U' |
|     return [U', $c_j$] |
| end function |

| Function FindUsers |
|---|
| function FindUsers(U, c, P', $j_c$, $\Delta t'$) |
|     U' = { }, w = 0 |
|     for $i \in U$ do |
|         for $j \in P'$ do |
|             if $I_{i,j} = 1 \wedge (\|c_j, L_{i,j}\| < \Delta t \vee$ |
|                 $(j = j_c \wedge \|c_j, L_{i,j}\| < \Delta t'))$ then |
|                 $w_i = w_i + 1$ |
|             end if |
|         end for |
|         if $w_i \geq \rho$ m then |
|             U' = U' $\cup$ {i} |
|         end if |
|     end for |
|     return [U', w] |
| end function |

In process 400, the UPDATESUBSPACE function works similar to step 206 in method 220. To update the subset of Pages P' that form the dimensions of the cluster 334 (i.e. the hypercube 334), while holding the updated center c of cluster 334, determined using UPDATECENTER, constant, the UPDATESUBSPACE function works by identifying new Pages that could be included in the subset of Pages P' such that more Like times of users are included within the cluster 334 for the present set of users who have one or more Like times currently included within the cluster 334. In one instance, the UPDATESUBSPACE function replaces one of the existing Pages (i.e. Pages "B", "C" and "D") with a new Page (e.g., Page "A") that has not only received a Like for each of the users who have a Like time included in the cluster 334 for the replaced Page (e.g., Page "B") but also increases the Like count within the cluster 334 by having received Likes from other users (i.e. users with Like time for Page "C" or "D" but not "B") whose Like time is included in the cluster 334. Therefore, with every update of the subset of Pages P', the number of Like times of a subset of users that fall within the cluster 334 for the subset of P' increases, resulting in convergence of the subset of Pages P' for the subset of users.

A pseudo code of the function UPDATESPACE, used in process 400, is shown below:

| Function FINDUSERS |
|---|
| function UPDATESUBSPACE (c, $P'_j$) |
|     P' = $P'_j$ |
|     U' = FINDUSERS (U,c,$P'_j$) |
|     for $j' \in P'_j$ do |
|         j'' = j' |
|         $U'_{j''}$ = FINDUSERS (U',$c_{j''}$,{j''}) |
|         for $j \in P\backslash P'$ do |
|             $U'_j$ = FINDUSERS (U', $c_j$,{j}) |
|             if $U'_{j''} \subset U'_j$ then |
|                 j''' = j, $U'_{j''} = U'_j$ |
|             end if |
|         end for |
|         P' = (P' \ {j'}) $\cup$ {j''} |
|     end for |
|     return P' |
| end function |

Performing process 400, in step 402, the lockstep detection engine 155 chooses a random subset of edges 354-374 between users and Pages from the social networking system 105 and initializes a cluster 334 with the Like times of the users associated with the edges 354-374 and initializes a subset of Pages P' with the Pages associated with the edges 354-374. The lockstep detection engine 155 utilizes the initial cluster 334 and subset of Pages P to start clustering the users and Pages from the social networking system 105 who exhibit lockstep behavior.

In step 404, while keeping the subset of Pages P' constant, the lockstep detection engine 155 updates the center c of the cluster 334. In some embodiment, the lockstep detection engine 155 updates the center c of the cluster 334 using the UPDATECENTER function discussed earlier. In step 406, using the updated center c of the cluster 334 received from step 404 while keeping the center c constant (i.e. the users with Like times within the cluster 334 constant), the lockstep detection engine 155 updates the subset of Pages P. In some embodiment, the lockstep detection engine 155 updates the subset of Pages P' using the UPDATESUBSPACE function discussed earlier.

In step 408 and 410, the lockstep detection engine 155 compares the center c of the cluster 334 before and after step 404 and the subset of Pages P' before and after step 406, respectively. If either the center c or the subset of Pages P' has changed, then the lockstep detection engine 155 determines that further convergence is possible (as discussed earlier) and returns to step 404 to repeat the clustering process utilizing the center c determined in earlier run of step 404 and the subset of Pages P' determined in earlier run of step 406.

If neither the center c nor the subset of Pages P' have changed, then the lockstep detection engine 155 determines convergence (as discussed earlier in the method 220) and proceeds to step 412 to determine if the subset of users who have Like times in the cluster 334 that can be considered a suspicious group of users exhibiting lockstep behavior. In some embodiments, the lockstep detection engine 155 determines if there are at least "n" users in the subset of users who each Liked at least $\rho*m$ Pages from the subset of Pages within a $2\Delta t$ window (i.e. the max distance from the center c). If the condition is met, the lockstep detection engine 155 then reports at least the "n" users as suspicious group of users exhibiting lockstep behavior. If the condition is not met, the lockstep detection engine 155 then reports that no suspicious group of users exhibiting lockstep behavior was found.

Figure 5:
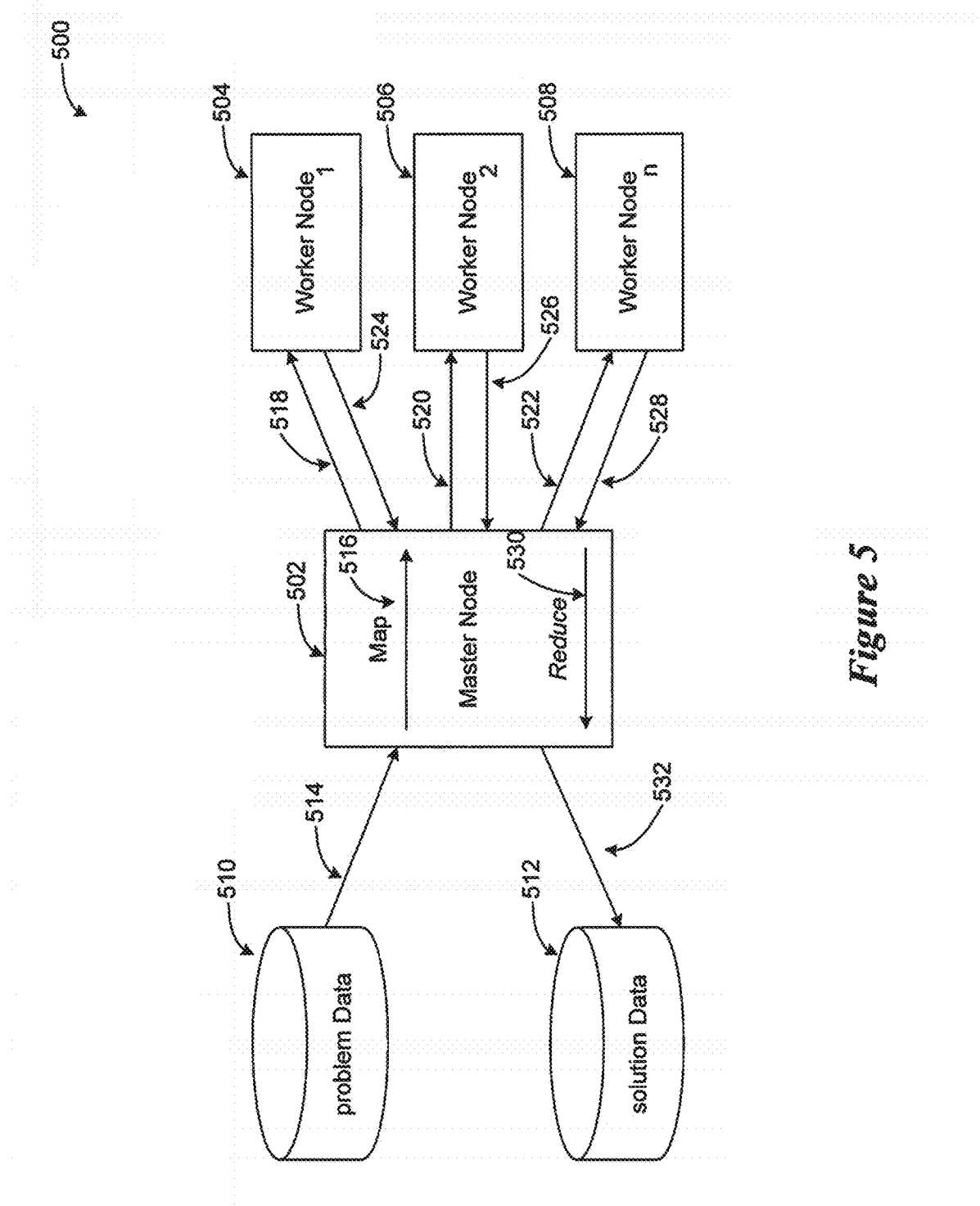
FIG. 5 provides an illustration of a MapReduce framework.

FIG. 5 provides an illustration of a MapReduce framework 500 used to process parallelizable problems, typically, across a distributed computing system comprising clusters of computers (e.g., a Hadoop computing system). The MapReduce framework is used to implement the method 220 to identify multiple suspicious group of users exhibiting lockstep behavior in parallel. The process 500, a flowchart of which is shown in FIG. 6, provides one implementation of parallel process that takes advantage of the MapReduce framework 500 to implement method 220 to identify multiple suspicious group of users exhibiting lockstep behavior.

As discussed above, MapReduce is a framework for processing parallelizable problems across huge datasets using a large number of computers 502-508 (also referred to as nodes), collectively referred to as a cluster. In MapReduce framework 500, the locality of data is utilized to process the data on or near the storage node storing the data to decrease transmission of data. In the MapReduce framework 500, the parallelization of a problem is performed using two two steps: a "Map" step 514-522 and a "Reduce" step 524-532.

In the "Map" step, a master node 502 (one of the nodes designated to manage all the other nodes) receives the problem data 510, 514, 516, divides it into smaller sub-problems 518-522, and distributes the sub-problems 518-522 to worker nodes 504-508. A worker node 504-508 may do this again in turn, leading to a multi-level tree structure. The worker node 504-508 processes the sub-problem 518-522, and passes the answer 524-528 back to its master node 502.

In the "Reduce" step, the master node 502 then collects the answers 524-528 to all the sub-problems 518-522 and combines them in some way to form the output 512, 530, 532, which is the answer to the problem the master node 502 was originally trying to solve. In some embodiments, similar to the "Map" step, the master node 502 performs the "Reduce" step by dividing the "Reduce" step into smaller sub-problems, and distributing the sub-problems to the worker nodes 504-508. The worker node 504-508 processes the sub-problem, and passes the answer back to the master node 502.

MapReduce framework 500 allows for distributed processing of the map and reduction operations. Provided each mapping operation is independent of the others, all maps can be performed in parallel. Similarly, a set of 'reducers' (i.e. nodes) can perform the reduction step, provided all outputs of the map operation that should be combined are presented to the same reducer at the same time.

Logical Overview of the MapReduce framework 500:

The Map and Reduce functions of MapReduce are both defined with respect to data structured in (key, value) pairs. Map takes one pair of data with a type in one data domain, and returns a list of pairs in a different domain: Map(k1,v1) →list(k2,v2).

The Map function is applied in parallel to every pair in the input dataset. This produces a list of pairs for each call. After that, the MapReduce framework collects all pairs with the same key from all lists and groups them together, creating one group for each key.

The Reduce function is then applied in parallel to each group, which in turn produces a collection of values in the same domain: Reduce(k2, list (v2, v3))→list(v4). Each Reduce call typically produces either one value v4 or an empty return, though one call is allowed to return more than one value. The returns of all calls are collected as the desired result list. Thus the MapReduce framework transforms a list of (key, value) pairs into a list of values.

For example, the MapReduce framework 500 can be used to count the total number of appearance of each word in an essay. In this example, the master node 502 would identify all the unique words in the essay and utilize each unique word as a key for the map. In the Map step, for each unique key k1 (i.e. word), the master node 502 could issue multiple jobs corresponding to a paragraph in the essay, where each paragraph in the essay constitutes the value v1. Each worker node 504-508 that receives a job (k1,v1) counts the number of times key k1 (i.e. unique word) appears in value v1 (i.e. paragraph) and returns a list (k2,v2) to the master node 502, where key k2 is the unique word (same as key k1) and v2 is the count of the number of times key k2 appeared in value v1.

In the Reduce step, the master node 502 can combine all the returned list with the same key as k2 and generate a list of values that corresponded to key k2. For example, here, the master node 502 could have received the count of key k2 in each paragraph (say there are five paragraphs in the essay) and produce a list with key k2, where the list includes the five returned values from the worker nodes 504-508 that each correspond to a paragraph in the essay. Next, the master node 502 could assign the reduce job to a reducer as a key-value pair to Reduce(k2, list (v2, v3, v4, v5, v6))→(k2, list(v7)). Here, the reducer simply adds the values in provided list and returns a key-value pair with the key as k2 and value v7 as the sum of the values in the provided list. The returned value will provide the count of the unique work that corresponds to key k2.

FIG. 6 provides a flowchart diagram of an illustrative parallel process 600 to implement the method 220 in the MapReduce framework 500 discussed above. Similar to process 400, in process 600, the center c of cluster 334 and subset of Pages P' of the subspace 326 are iteratively updated till they converge. Further, instead of just updating the center c of one cluster 334 and its associated subset of Pages P' of the subspace 326, in process 600, multiple clusters and their associated subset of Pages P' (that correspond to a subspace in the M dimensional space) are initiated and updated in parallel until each cluster converges to identify multiple groups of suspicious users engaging in lockstep behavior in the social networking system 105. In some embodiments, the multiple clusters are iteratively updated a fixed number of times and a determination is made whether any cluster corresponds to a group of suspicious users engaging in lockstep behavior.

In process 600, the MapReduce framework 500 is utilized to parallelize the implementation of the method 220. In process 600, one MapReduce job is run per iteration of updating the center c of the multiple clusters and their associated subset of Pages P'. A pseudo code of process 600 is shown below in "Process 2 MapReduce COPYCATCH":

| Process 2 MapReduce COPYCATCH | |
|---|---|
| 1: | Require: Preset parameters $\Delta t$, m, and $\rho$ |
| 2: | C, P = INITIALIZE( ) |
| 3: | repeat |
| 4: | $C_l$ = C, $P_l$ = P |
| 5: | C, P = MAPREDUCEJOB ($C_l$, $P_l$) |
| 6: | until $C_l$ = C $\wedge$ $P_l$ = P |
| 7: | return [C, P] |

As explained earlier, the MapReduce job is performed in two steps: the Map step; and the Reduce step. In the Map step, the input is split among many worker nodes 504-508. Each worker node 504-508 gets a pair of data of the form $\langle \text{KEY}_{map}, \text{VALUE} \rangle$, where $\text{KEY}_{map}$ could be left as null and the VALUE could a given user's time of Like for a subset of Pages the given user previously Liked, and returns an output zero or a result of the form $\langle \text{KEY}_{reduce}, \text{VALUE} \rangle$. As explained below, the $\text{KEY}_{reduce}$ could be a number identifying one of the multiple clusters the given user's times of Like fall within and the VALUE returned could simply be same as the VALUE provided as input to the worker nodes 504-508 (i.e. the given user's time of Like for a subset of Pages the given user previously Liked).

In process 600, in the reducer step, for each unique $\text{KEY}_{reduce}$ (i.e. a number identifying one of the multiple clusters), a reducer is formed which takes as an input $\langle \text{KEY}_{reduce}, \text{VALUES} \rangle$, where VALUES is a set of the VALUE outputs (i.e. the time of Like for a corresponding set of Pages for each user identified in the Map step) from the Map step which correspond to that reducer's particular $\text{KEY}_{reduce}$. For a given cluster that corresponds to $\text{KEY}_{reduce}$, the reducer then updates the center c of the cluster and the subset of Pages P' associated with that cluster and returns the updated center c of the cluster and the subset of Pages P' to the master node 502. Similar to process 400, in process 600, the master node 502 compares the returned clusters and their subset of Pages P' against the prior version of the clusters and their subset of Pages P' to determine convergence (i.e. if unchanged, then converged). In process 600, if the master node 502 determines the data has not converged, the master node 502 initiates another iteration of MapReduce Job with the updated set of clusters and their associated subset of Pages P'.

In our process 600, the worker node 504-508 utilizes a USERMAPPER function to perform the Map step. A pseudo code of the function USERMAPPER, used in process 600, is shown below. The function USERMAPPER, as discussed earlier, takes as input a given user's time of Like for a subset of Pages the given user previously Liked. Based on the provided Like times of the given user, the USERMAPPER checks across each of the multiple clusters to see if the time of Likes of the given user falls within that cluster (as explained earlier in process 400). If the time of Likes of the given user does fall within a given cluster, an ID of the given cluster (identifying the cluster) is outputted as a key "$\text{KEY}_{reduce}$", and the time of Like for a subset of Pages the given user previously Liked is outputted as value "VALUE" in the form $\langle \text{KEY}_{reduce}, \text{VALUE} \rangle$.

| Procedure 3 UserMapper($\langle$NULL, $(L_{i,}*, I_{i,}*)\rangle$) | |
|---|---|
| 1: | Globals: C, P |
| 2: | for k = 1 . . . s do |
| 3: | $\sigma = \Sigma_{j \in P'_k} I_{i,j} \cdot \phi(c^{(k)}_j, L_{i,j})$ |
| 4: | if $\sigma \geq \rho m$ then |
| 5: | emit $\langle k, (L_{i,}*, I_{i,}*)\rangle$ |
| 6: | end if |
| 7: | end for | where, function $\phi$ is defined in expression (1), as shown below:

$$\phi(t_c, t_u) = \begin{cases} 1 & \text{if } |t_c - t_u| \leq t \\ 0 & \text{otherwise} \end{cases} \quad (1)$$

In our process 600, the worker node 504-508 utilizes an ADJUSTCLUSTER-REDUCER function to perform the Reduce step. A pseudo code of the function ADJUSTCLUSTER-REDUCER, used in process 600, is shown below:

| Procedure 4 ADJUSTCLUSTER-REDUCER(k, U') | |
|---|---|
| 1: | Globals: C, P |
| 2: | Initialize c = 0, p = 0, v = 0 |
| 3: | for all map values $(L_{i,}*, I_{i,}*) \in$ U' do |
| 4: | for j = 1 . . . M do |
| 5: | if $I_{i,j} = 1 \,\hat{}\, \phi(c^{(k)}_j, L_{i,j}) = 1$ then |
| 6: | $c_j = c_j + L_{i,j}$ |
| 7: | $p_j = p_j + 1$ |
| 8: | $v_j = v_j + (c^{(k)}_j - L_{i,j})^2$ |
| 9: | end if |
| 10: | end for |
| 11: | end for |
| 12: | $c^{(k)}$ = c/p |
| 13: | v = v/p |
| 14: | Sort $\{j\}^M_1$ by p (decreasing), then v (increasing) |
| 15: | Set $P'_k$ to top m columns from previous sort |
| 16: | return Updated $c^{(k)}$ and $P'_k$ |

The function ADJUSTCLUSTER-REDUCER, as discussed earlier, receives an input $\langle \text{KEY}_{reduce}, \text{VALUES} \rangle$, where $\text{KEY}_{reduce}$ is the ID of a given cluster and the VALUES is a set of the VALUE outputs (i.e. the time of Like for a corresponding set of Pages for each user identified in the Map step) from the Map step which correspond to the particular $\text{KEY}_{reduce}$. For the given cluster that corresponds to $\text{KEY}_{reduce}$, the ADJUST-CLUSTER-REDUCER function then updates the center c of the given cluster and the subset of Pages P' associated with the given cluster and returns the updated center c of the cluster and the subset of Pages P' to the master node 502. In function ADJUSTCLUSTER-REDUCER, the center c of the cluster is updated in each dimension (i.e. each Page in the subset of Pages P' that correspond to a dimension) by taking an average of the time of Likes of all the users who fall within the cluster in that dimension.

Further, in function ADJUSTCLUSTER-REDUCER, the subset of Pages P' are updated by selecting the Pages (from the available Pages M in the social networking system 105) that cover the most users (who have a time of Like) within the previous cluster (i.e. before the center c of the cluster is updated), and also have the least variance among the users who Liked the subset of Pages P'. As discussed earlier, such a process can potentially drive the subset of users and Pages to converge.

Performing process 600, in step 602, the lockstep detection engine 155 chooses a random subsets of edges 354-374 between users and Pages from the social networking system 105 and initializes a set of clusters with the Like times of the users associated a corresponding subset of edges 354-374. Further, the lockstep detection engine 155 initializes each subset of Pages P associated with each of the set of clusters with the Pages associated with the corresponding subset of edges 354-374. The lockstep detection engine 155 utilizes the initial set of clusters 334 and their associated subsets of Pages P' to start clustering the users and Pages from the social networking system 105 who exhibit lockstep behavior.

In step 604, the lockstep detection engine 155 performs the Map step of the MapReduce job on the set of clusters and their associated subsets of Pages P'. As discussed earlier, in the Map step 606, using the USERMAPPER function, for each of the set of clusters, the lockstep detection engine 155 determines all the users whose time of Likes for the subset of Pages P (associated with the given cluster) falls within the cluster. Next, in Map step 608, the lockstep detection engine 155 receives, for each of the identified user who falls within any of the set of clusters, a key-value pair of the ID of the cluster the user falls into and the corresponding times of Like of the user.

In step 610, the lockstep detection engine 155 performs the Reduce step of the MapReduce job on the set of clusters and their associated subsets of Pages P'. As discussed earlier, in the Reduce step 612, the lockstep detection engine 155 combines the users who fall within a cluster into a key-value pair and performs a reduction of the data using the ADJUST-CLUSTER-REDUCER function. In step 614, using the received times of Like of each user who falls within a given cluster, the lockstep detection engine 155 updates the center c of the cluster. In step 616, the lockstep detection engine 155 updates the subset of Pages P' by selecting the Pages (from the available Pages M in the social networking system 105) that cover the most users (who have a time of Like) within the previous cluster (i.e. before the center c of the cluster is updated), and also have the least variance among the users who Liked the subset of Pages P'. In step 616, the lockstep detection engine 155 receives the updated center c of the cluster and the subset of Pages P'.

In step 618, the lockstep detection engine 155 compares all the center c of the set of clusters before and after MapReduce and the subsets of Pages P' before and after MapReduce. If either any of the center c or the any of subsets of Pages P have changed, then the lockstep detection engine 155 determines that further convergence is possible (as discussed earlier) and returns to step 604 to repeat the clustering process utilizing the MapReduce job.

If neither the centers c nor the subsets of Pages P' have changed, then the lockstep detection engine 155 determines convergence (as discussed earlier in the method 220) and proceeds to step 620 to determine if any of the subsets of users who have Like times in the set of clusters can be considered a suspicious group of users exhibiting lockstep behavior. In some embodiments, the lockstep detection engine 155 determines if there are at least "n" users in the subset of users who each Liked at least $\rho*m$ Pages from the subset of pages within a $2\Delta t$ window (i.e. the max distance from the center c). If the condition is met, the lockstep detection engine 155 then reports at least the "n" users in the subset of users as suspicious group of users exhibiting lockstep behavior. If the condition is not met, the lockstep detection engine 155 then reports that no suspicious group of users exhibiting lockstep behavior was found.

Figure 7:
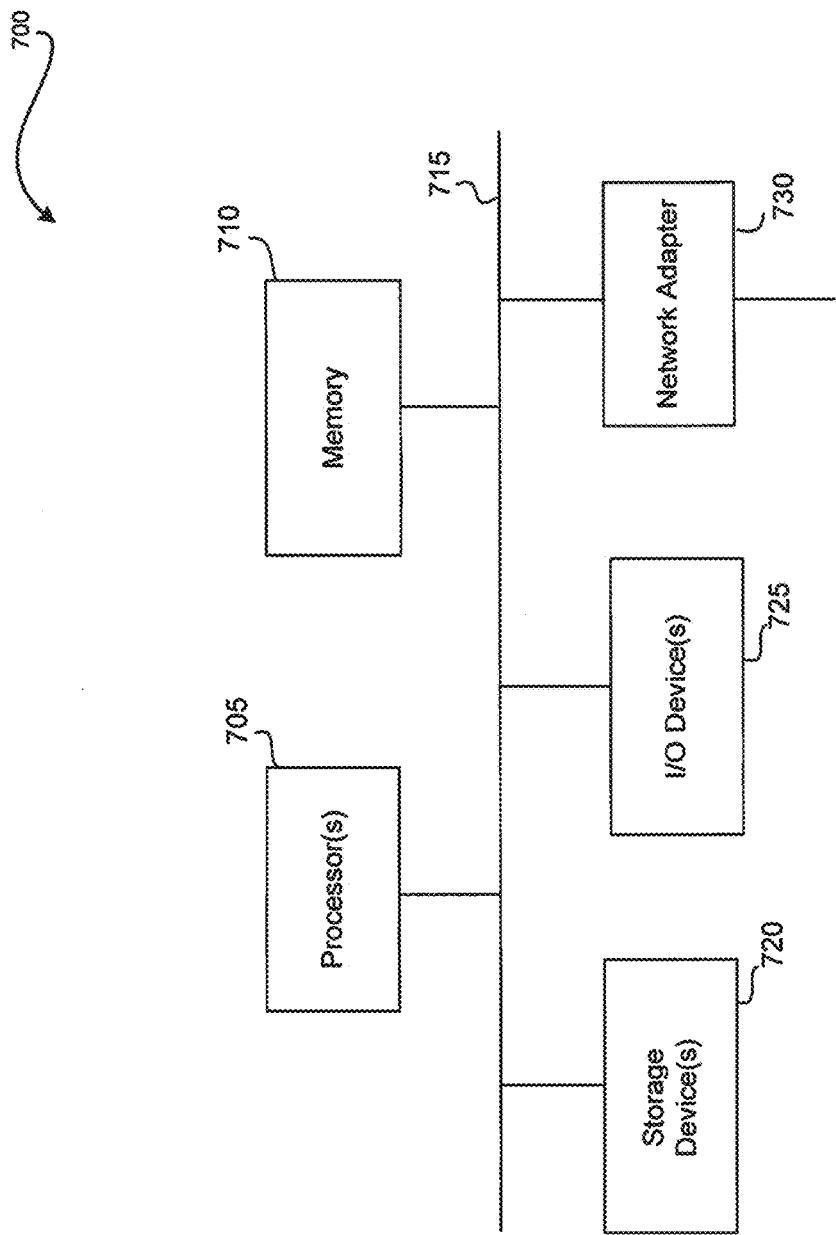
FIG. 7 is a block diagram of a processing system that can implement operations of the present invention.

FIG. 7 is a block diagram of an apparatus that may perform various operations, and store various information generated and/or used by such operations, according to an embodiment of the disclosed technique. The apparatus can represent any computer or processing system described herein. The processing system 700 is a hardware device on which any of the entities, components or services depicted in the examples of FIGS. 1-6 (and any other components described in this specification) can be implemented. The processing system 700 includes one or more processors 705 and memory 710 coupled to an interconnect 715. The interconnect 715 is shown in FIG. 7 as an abstraction that represents any one or more separate physical buses, point to point connections, or both connected by appropriate bridges, adapters, or controllers. The interconnect 715, therefore, may include, for example, a system bus, a Peripheral Component Interconnect (PCI) bus or PCI-Express bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 705 is/are the central processing unit (CPU) of the processing system 700 and, thus, control the overall operation of the processing system 700. In certain embodiments, the processor(s) 705 accomplish this by executing software or firmware stored in memory 710. The processor(s) 705 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 710 is or includes the main memory of the processing system 700. The memory 710 represents any form of random access memory (RAM), read-only memory (ROM), flash memory, or the like, or a combination of such devices. In use, the memory 710 may contain a code. In one embodiment, the code includes a general programming module configured to recognize the general-purpose program received via the computer bus interface, and prepare the general-purpose program for execution at the processor. In another embodiment, the general programming module may be implemented using hardware circuitry such as ASICs, PLDs, or field-programmable gate arrays (FPGAs).

Also connected to the processor(s) 705 through the interconnect 715 are a network adapter 730, a storage device(s) 720 and I/O device(s) 725. The network adapter 730 provides the processing system 700 with the ability to communicate with remote devices, over a network and may be, for example, an Ethernet adapter or Fibre Channel adapter. The network adapter 730 may also provide the processing system 700 with the ability to communicate with other computers within the cluster. In some embodiments, the processing system 700 may use more than one network adapter to deal with the communications within and outside of the cluster separately.

The I/O device(s) 725 can include, for example, a keyboard, a mouse or other pointing device, disk drives, printers, a scanner, and other input and/or output devices, including a display device. The display device can include, for example, a cathode ray tube (CRT), liquid crystal display (LCD), or some other applicable known or convenient display device.

The code stored in memory 710 can be implemented as software and/or firmware to program the processor(s) 705 to carry out actions described above. In certain embodiments, such software or firmware may be initially provided to the processing system 700 by downloading it from a remote system through the processing system 700 (e.g., via network adapter 730).

The techniques introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine.

A machine can also be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

A machine-accessible storage medium or a storage device(s) 720 includes, for example, recordable/non-recordable media (e.g., ROM; RAM; magnetic disk storage media; optical storage media; flash memory devices; etc.), etc., or any combination thereof. The storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

The term "logic", as used herein, can include, for example, programmable circuitry programmed with specific software and/or firmware, special-purpose hardwired circuitry, or a combination thereof.

What is claimed is:

1. A method of identifying a group of suspicious users of a social network who produce fraudulent web contents in the social network, the method comprising:
    selecting an initial group of users from an overall group of users of the social network and an initial set of web contents from an overall set of web contents in the social network,
        wherein each user of the initial group of users is associated with at least one of the initial set of web contents, and
        wherein each web content of the initial set of web contents is associated with at least one of the initial group of users,
        wherein each web content of the overall set of web contents has a timeframe of a specific length for the corresponding web content;
    setting a current group of users to be the initial group of users and a current set of web contents to be the initial set of web contents;
    setting a current cluster to be a combination of the current group of users and the current set of web contents;
    updating iteratively the current cluster to increase a number of multiple associations in the current cluster, each of the multiple associations satisfying a specific criterion and having a time value falling in the timeframe for a web content of the corresponding association, until the current cluster comprising the current group of users and the current set of web contents does not change from a previous iteration;
    determining whether a condition is satisfied, the condition being a size of the current group of users exceeds a first specified value and a size of the current set of web contents exceeds a second specified value, wherein the first and second specified values are positive integers; and
    in an event the condition is satisfied:
        identifying the current group of users as the group of suspicious users, and
        removing the current set of web contents from the social network.

2. The method of claim 1,
    wherein through the multiple associations that satisfy the specific criterion, each user of the current group of users is associated with each web content of a subset of the current set of web contents,
    wherein a size of the subset is a product of the second specified value and a third specified value, and
    wherein the third specified value is a fraction.

3. The method of claim 1, the updating comprising:
    adjusting the current group of users for the current set of web contents to increase the number of the multiple associations in the current cluster; and
    after any adjustment of the current group of users, adjusting the current set of web contents for the current group of users to increase the number of the multiple associations in the current cluster.

4. The method of claim 3, wherein adjusting the current group of users comprises:
    for each web content of the current set of web contents, computing an aggregate of a set of time values of a set of associations associated with the corresponding web content;
    for each web content of the current set of web contents, updating a timeframe for the corresponding web content based on the aggregate to generate a set of timeframes; and
    adding a first set of users from the overall group of users to the current group of users or removing a second set of users from the current group of users to increase the number of the multiple associations in the current cluster based on the set of time values and the set of time frames.

5. The method of claim 1,
    wherein each association of the multiple associations between a specified user of the current group of users and a specified web content of the current set of web contents indicates an acknowledgment by the specified user of the specified web content; and
    wherein the time value of the corresponding association indicates a time at which the specified user indicated the acknowledgement of the specified web content.

6. The method of claim 1, the selecting comprising:
    including in the initial group of users a random subgroup of the overall group of users;
    including in the initial set of web contents a random subset of the overall set of web contents;
    removing from the initial group of users every user that is not associated with any of the initial set of web contents; and
    removing from the initial set of web contents every web content that is not associated with any of the initial group of users.

7. The method of claim 1, further comprising:
if the condition is satisfied, reporting that the current set of web contents is fraudulent; and
if the condition is not satisfied, reporting that no fraudulent web contents have been found.

8. A system for identifying a group of suspicious users of a social network who produce fraudulent web contents in the social network, comprising:
at least one memory storing computer-executable instructions;
at least one processor; and
a lockstep detection engine configured to:
set a current group of users to be a subgroup of an overall group of users of the social network and a current set of web contents to be a subset of an overall web contents in the social network,
wherein each user of the current group of users is related to at least one of the current set of web contents,
wherein each web content of the current set of web contents is related to at least one of the current group of users, and
wherein each web content of the overall set of web contents has a timeframe of a specific length for the corresponding web content;
set a current cluster to be a combination of the current group of users and the current set of web contents;
iteratively update the current cluster to increase a number of multiple relations in the current cluster, each of the multiple relations satisfying a specific criterion and having a time value falling in the timeframe for a web content of the corresponding relation, until the current cluster comprising the current group of users and the current set of web contents does not change from a previous iteration;
determine whether a condition is satisfied, the condition being a size of the current group of users exceeds a first specified value and a size of the current set of web contents exceeds a second specified value, wherein the first and second specified values are positive integers; and
in an event the condition is satisfied:
identify the current group of users as the group of suspicious users, and
remove the current set of web contents from the social network.

9. The system of claim 8,
wherein through the multiple relations that satisfy the specific criterion, each user of the current group of users is related to each web content of a subset of the current set of web contents
wherein a size of the subset is a product of the second specified value and a third specified value, and
wherein the third specified value is a fraction.

10. The system of claim 8, wherein the lockstep detection engine is configured to:
adjust the current group of users for the current set of web contents to increase the number of the multiple relations in the current cluster; and
adjust, after any adjustment of the current group of users, the current set of web contents for the current group of users to increase the number of the multiple relations in the current cluster.

11. The system of claim 10, wherein the lockstep detection engine is configured to:

compute, for each web content of the current set of web contents, an aggregate of a set of time values of a set of relations related to the corresponding web content;
update, for each web content of the current set of web contents, a timeframe for the corresponding web content based on the aggregate to generate a set of timeframes; and
add a first set of users from the overall group of users to or remove a second set of users from the current group of users to increase the number of the multiple relations in the current cluster based on the set of time values and the set of time frames.

12. The system of claim 8,
wherein each relation of the multiple relations between a specified user of the current group of users and a specified web content of the current set of web contents indicates a liking by the specified user of the specified web content; and
wherein the time value of the corresponding relation indicates a time at which the specified user indicated the liking of the specified web content.

13. The system of claim 8, wherein the lockstep detection engine is further configured to:
include in the current group of users a random subgroup of the overall group of users;
include in the current set of web contents a random subset of the overall set of web contents;
remove from the current group of users every user that is not related to any of the current set of web contents; and
remove from the current set of web contents every web content that is not related to any of the current group of users.

14. The system of claim 8, wherein the lockstep detection engine is further configured to:
report, if the condition is satisfied, that the current set of web contents is fraudulent; and
report, if the condition is not satisfied, that no fraudulent web contents have been found.

15. A non-transitory machine-readable storage medium having stored thereon a set of instructions which when executed perform a method of identifying a group of suspicious users of a social network who produce fraudulent web contents in the social network, the method comprising:
selecting an initial group of users from an overall group of users of the social network and an initial set of web contents from an overall set of web contents in the social network,
wherein each user of the initial group of users is associated with at least one of the initial set of web contents, and
wherein each web content of the initial set of web contents is associated with at least one of the initial group of users,
wherein each web content of the overall set of web contents has a timeframe of a specific length for the corresponding web content;
setting a current group of users to be the initial group of users and a current set of web contents to be the initial set of web contents;
setting a current cluster to be a combination of the current group of users and the current set of web contents;
updating iteratively the current cluster to increase a number of multiple associations in the current cluster, each of the multiple associations satisfying a specific criterion and having a time value falling in the timeframe for a web content of the corresponding association, until the current cluster comprising the current group of users and the current set of web contents does not change from a previous iteration;

determining whether a condition is satisfied, the condition being a size of the current group of users exceeds a first specified value and a size of the current set of web contents exceeds a second specified value,
wherein the first and second specified values are positive integers; and in an event the condition is satisfied:
identifying the current group of users as the group of suspicious users, and
removing the current set of web contents from the social network.

16. The storage medium of claim 15,
wherein through the multiple associations that satisfy the specific criterion, each user of the current group of users is associated with each web content of a subset of the current set of web contents,
wherein a size of the subset is a product of the second specified value and a third specified value, and
wherein the third specified value is a fraction.

17. The storage medium of claim 15, the updating comprising:
adjusting the current group of users for the current set of web contents to increase the number of the multiple associations in the current cluster; and
after any adjustment of the current group of users, adjusting the current set of web contents for the current group of users to increase the number of the multiple associations in the current cluster.

18. The storage medium of claim 17, wherein adjusting the current group of users comprises:

for each web content of the current set of web contents, computing an aggregate of a set of time values of a set of associations associated with the corresponding web content;

for each web content of the current set of web contents, updating the timeframe for the corresponding web content based on the aggregate to generate a set of timeframes; and adding a first set of users from the overall group of users to the current group of users or removing a second set of users from the current group of users to increase the number of the multiple associations in the current cluster based on the set of time values and the set of time frames.

19. The storage medium of claim 15,
wherein each association of the multiple associations between a specified user of the current group of users and a specified web content of the current set of web contents indicates an acknowledgment by the specified user of the specified web content; and
wherein the time value of the corresponding association indicates a time at which the specified user indicated the acknowledgement of the specified web content.

20. The storage medium of claim 15, wherein the method further comprises:
if the condition is satisfied, reporting that the current set of web contents is fraudulent; and
if the condition is not satisfied, reporting that no fraudulent web contents have been found.

* * * * *